(12) United States Patent
Brandwine et al.

(10) Patent No.: US 9,785,928 B1
(45) Date of Patent: Oct. 10, 2017

(54) VIRTUALIZED ADMINISTRATION OF SOFTWARE USE AUTHORIZATION

(75) Inventors: Eric Jason Brandwine, Haymarket, VA (US); Marvin M. Theimer, Bellevue, WA (US); Benjamin W. Mercier, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 1299 days.

(21) Appl. No.: 13/111,867

(22) Filed: May 19, 2011

(51) Int. Cl.
*G06Q 20/12* (2012.01)
*G06F 9/445* (2006.01)

(52) U.S. Cl.
CPC ........... *G06Q 20/1235* (2013.01); *G06F 8/61* (2013.01)

(58) Field of Classification Search
CPC .................................................. G06Q 20/1235
USPC ........................................................... 705/51
See application file for complete search history.

(56) References Cited

U.S. PATENT DOCUMENTS

| | | | | |
|---|---|---|---|---|
| 5,764,762 | A * | 6/1998 | Kazmierczak et al. | 705/52 |
| 5,826,244 | A | 10/1998 | Huberman | 705/37 |
| 6,078,906 | A | 6/2000 | Huberman | 705/37 |
| 7,996,835 | B2 * | 8/2011 | Griffith et al. | 718/1 |
| 2002/0120461 | A1 | 8/2002 | Kirkconnell-Ewing et al. | 705/1 |
| 2002/0120519 | A1 | 8/2002 | Martin et al. | 705/21 |
| 2003/0195813 | A1 | 10/2003 | Pallister et al. | 705/26 |
| 2004/0122926 | A1 * | 6/2004 | Moore et al. | 709/223 |
| 2004/0243583 | A1 | 12/2004 | Olsen | 707/10 |
| 2009/0328225 | A1 * | 12/2009 | Chambers et al. | 726/26 |

OTHER PUBLICATIONS

"Metering and Accounting for Web Servieces," IBM®, Jul. 2001, retrieved from http://www-106.ibm.com/developerworks/library/ws-maws/, 6 pages.
"NTT Com to Launch Asia's First UDDI Registry on Oct. 9," Oct. 8, 2002, NTT Communications, retrieved Sep. 9, 2005, from http://www.ntt.com/release_e/news02/0010/1008.html, 3 pages.
(Continued)

*Primary Examiner* — Calvin L Hewitt, II
*Assistant Examiner* — Cristina Sherr
(74) *Attorney, Agent, or Firm* — Seed IP Law Group LLP

(57) ABSTRACT

Techniques are described for managing software whose use is restricted in one or more manners. In some situations, the software components are fee-based components that are made available by providers of the components for use by others in exchange for fees defined by the components providers, and the software components may also have various other non-price conditions related to their use. The described techniques facilitate use of a software component on a computing node by configuring a virtual computer port or other virtual interface on the computing node, to enable the software component to make a request via the provided virtual interface regarding whether a current use of the software component is authorized. A trusted source receives and responds to the use authorization request in a manner configured by the provider of the software component, such as by a node manager module of a program execution service.

19 Claims, 8 Drawing Sheets

(56) References Cited

OTHER PUBLICATIONS

"The Bowstreet™ Business Web Exchange Fuels B2B Revolution With First-of-its-Kind 'Web Services' Marketplace," Mar. 16, 2000, Bowstreet.com Inc., retrieved Sep. 9, 2005, from http://web.archive.org/web/20010219033902/http://www.bowstreet.com/news/press_release. . . , 4 pages.
"The Web Services Architect: Catalysts for Fee-Based Web Services," IBM®, Nov. 2001, retrieved from http://www-106.ibm.com/developerworks/library/ws-arc6/, 7 pages.
"Web Service Use Case," ContentGuard Holdings, Inc., Retrieved Aug. 9, 2005, from http://www.contentguard.com/reference/docs/SimpleWebServiceExampleContent.htm, 4 pages.
"Web Service Use Case: Travel Reservation—Use Case May 5, 2002," W3C®, May 2002, retrieved Aug. 9, 2005, from http://www.w3.org/2002/06/ws-example, 9 pages.
"Web Services Architecture Usage Scenarios—W3C Working Draft Jul. 30, 2002," W3C®, Jul. 2002, retrieved Apr. 4, 2008, from http://www.w3.org/TR/2002/WD-ws-arch-scenarios-20020730/, 51 pages.
"Web Services Marketplace," retrieved Sep. 9, 2005, from http://web.archive.org/web/20010404230735/www/epicentric.com/solutions/mkt.jsp, 4 pages.
Actional™, The Web Services Management Platform: Managing the Impact of Change in an Enterprise Web Services Network—Mar. 2003, retrieved Nov. 7, 2003, from http://www.actional.com/downloads/products/managing.enterpiriseweb.services.network.pdf, 26 pages.
Actional™, Web Services Mangament Platform, retrieved Nov. 7, 2003, from http://www.actional.com/products/web_services/index.asp, 3 pages.
Albrecht, C., et al., "Marketplace and Technology Standards for B2B. Ecommerce: Progress and Challenges," MIS Quarterly Special Issue on Standard Making, International Conference on Information Systems, Dec. 2003, Seattle, WA, pp. 188-209, 23 pages.
Allidex, Frequently Asked Questions, retrieved Nov. 4, 2003, from http://www.allidex.com/faq.html, 4 pages.
Amazon.com, Inc., Associates: Enhance Your Site Using Web Services, retrieved Nov. 4, 2003, from http://www.amazon.com/gp/browse.html/ref=sc_____bb_1_1/104-7530911-9659969?no=3435361&me=A3.6.L, 2 pages.
Amazon.com, Inc. Developers: Build Solutions for Amazon Partners, retrieved Nov. 4, 2003, from http://www.amazon.com/gp/browse.html/ref=sc_____bb_1_1/104-7530911-9659969?no=3435361&me=A3.6.L, 2 pages.
Amazon.com, Inc., Sellers and Vendors: Sell More Using Web Services, retrieved Nov. 4, 2003, from http:www.amazon.com/gp/browse.html/ref=sc_bb_1_1/104-7530911-9659969?no=3435361&me=A3.6.L, 1 page.
Amazon.com, Inc., Web Services FAQ's, retrieved Nov. 4, 2003, from http://www.amazon.com/gp/browse.html/ref=sc_bb_1_0/104-7530911-9659969?no=3435361&me=A3.6.L, 11 pages.
Amazon.com, Inc., Web Services, retrieved Nov. 4, 2003, from http://www.amazon.com/gp/browse.html/104-7530911-9659969?node=3435361, 2 pages.
Amazon.com, Inc., Web Services, "Amazon Elastic Compute Cloud (Amazon EC2)—Limited Beta," Retrieved Oct. 13, 2007, from http://www.amazon.com/b/ref=sc_fe_1_2/105-1515636-7955636?ie=UTF8&node=201590011& . . . , 5 pages.
Amazon.com, Inc., Web Services, "Amazon Simple Storage Service (Amazon S3)," retrieved Oct. 13, 2007, from http://www.amazon.com/S3-AWS-home-page-Money/b/ref=sc_fe_1_2/105-1515636-7955636?ie . . . , 5 pages.
Amazon.com, Inc., Web Services, "Amazon Simple Queue Service (Amazon SQS)," retrieved Oct. 13, 2007, from http://www.amazon.com/Simple-Queue-Service-home-page/b/ref=sc_fe_1_2/105-1515636-7955 . . . , 4 pages.
Amazon.com, Inc., "Paid AMIs," retrieved Oct. 13, 2007, from http://docs.amazonwebservices.com/AWSEC2/2007-03-01/DeveloperGuide/Paid_AMIs.html, 1 page.
Amazon.com, Inc., "Paying for AMIs," retrieved Oct. 13, 2007, from http://docs.amazonwebservices.com/AWSEC2/2007-03-01/DeveloperGuide/AESDG-chapeter-usi . . . , 2 pages.
Amazon.com, Inc., Web Services, "Tech. Note: Using Paid AMIs and the Demo Paid AMI," retrieved Oct. 13, 2007, from http://developer.amazonwebservices.com/connect/entry.jspa?externalID-866, 2 pages.
Andrews, T., et al., "Specification: Business Process Execution Language for Web Services Version 1.1," IBM developerWorks, May 5, 2003, retrieved Jan. 31, 2005, from http://www-106.ibm.com/developerworks/webservices/library/ws-bpel/, 124 pages.
Binstock, A., "Staking New Territory, Breaking New Ground," retrieved Sep. 9, 2005, from http://archive.devx.com/javaSR/articles/binstock/binstock.asp, 6 pages.
Box, Don et al., "Web Services Policy Framework (WS-Policy)," Jun. 2, 2003, retrieved Sep. 12, 2005, from ftp://www6.software.ibm.com/software/developer/library/ws-policy2003.pdf, 21 pages.
Brown, R., "Epicentric Unveils Web Services E-Hub," Mar. 21, 2001, Line56.com, retrieved Sep. 9, 2005, from http://www.line56.com/print/default.asp?ArticleID=2287, 2 pages.
Bunting, Doug et al., "Web Services Composite Application Framework (WS-CAF)," Jul. 28, 2003, retrieved Sep. 12, 2005, from http://www.oasis-open.org/committees/download.php/4343/WS-CAF%20Primer.pdf, 23 pages.
Burbeck, S., "The Tao of E-Business Services—The Evolution of Web Applications Into Service-Oriented Components With Web Services," Oct. 2000, IBM®, http://www-4.ibm.com/software/developer/library/ws-tao/index.html, 13 pages.
Business Wire, "Desktop.com Introduces Devtop, the First Integrated Platform for Building Deploying, and Distributing Web-Based Applications," Jun. 26, 2000, retrieved Sep. 8, 2005, from http://www.findarticles.com/p/articles/mi_m0EIN/is_2000_June_26/ai_62915951/print, 2 pages.
Clark, M., "Business Architecture for a Web Services Brokerage—Understanding the Business Context of Web Services," Aug. 1, 2001, retrieved Aug. 2, 2005, from http://www.webservicesarchitect.com/content/articles/clark01print.asp, 5 pages.
CPA2Biz, Inc., "New Rivio Business Services Suite," Apr. 18, 2001, retrieved Sep. 8, 2005, from https://www.cpa2biz.com/Corp/Press+Releases/PR_WebTools_18APR01.htm, 3 pages.
CPA2Biz, Inc., "Verizon Unveils Rivio Web Services Suite for Small Business Customers," May 29, 2001, retrieved Sep. 22, 2005, from https://www.cpa2biz.com/Corp/Press+Releases/PR_VERIZON_29MAY01.HTM, 3 pages.
E2Open™, E2open Products, retrieved Nov. 7, 2003, from http://www.e2open.com/products/, 3 pages.
E2Open™, The E2open Integration Platform, retrieved Nov. 7, 2003, from http://www.e2open.com/downloads/e2open integration platform datasheet.pdf, 5 pages.
EbizQ, Product Quicktake, retrieved Nov. 7, 2003, from http://www.ebizq.net/reports/1884.html?download=1, 2 pages.
Grand Central™ Communications website, retrieved Nov. 6, 2003, from http://www.grandcentral.com/products/, 2 pages.
Grand Central™ Communications, Frequently Asked Questions, retrieved Nov. 6, 2003, from http://www.grandcentral.com/products/faqs/index_html, 5 pages.
InfromationWeek, "Amazon EC2 Lets Users Sell Software as a Service," Aug. 1, 2007, retrieved Oct. 13, 2007, from http://www.informationweek.com/shared/printableArticleSrc.jhtml?articleD=201202196, 1 page.
Irani, R., "Web Services Intermediaries—Adding Value to Web Services," Nov. 21, 2001, retrieved Aug. 2, 2005, from http://www.webservicesarchitect.com/content/articles.irani07print.asp, 5 pages.
Jamcracker, Inc., "Jamcracker announces Pivot Path: Fully integrated Software Suite for Identity Management," Nov. 11, 2003, retrieved Sep. 12, 2005, from http://web.archive.org/web/20040607054618/http://jamcracker.com/pivot_path_release.pdf, 2 pages.

(56) References Cited

OTHER PUBLICATIONS

Khare, R., "Whiz-Bangery, Indeed: Primordial's WSBANG," Nov. 16, 2001, retrieved Sep. 9, 2005, from http://lair.xent.com/pipermail/fork/2001-November/006569.html, 2 pages.
Lee, Yvonne L., "StrikeIron's Hot for Web Services," *SD Times*, Jun. 1, 2004, retrieved Sep. 12, 2005, from http://www.strikeiron.com/doc/SDTimes060104.pdf, 1 page.
Levitt, J., "From EDI to XML and UDDI: A Brief History of Web Services," Oct. 1, 2001, InformationWeek, retrieved Sep. 9, 2005, from http://www.informationweek.com/story/IWK20010928S0006, 3 pages.
Leymann, F., "Web Services Flow Language (WSFL 1.0)," IBM Software Group, May 2001, 108 pages.
Oasis, UDDI.org, retrieved Sep. 8, 2005, from http://www.uddi.org/find.html, 2 pages.
PayPal.com Recurring Billing Service: How it Works, retrieved Dec. 5, 2006, from http://www.paypal.com/cgi-bin/webser?cmd=playflow-recurring-billing-integration-outside, 2 pages.
PayPal.com, Recurring Billing Service: FAQs, retrieved Dec. 5, 2006, from http://www.paypal.com/cgi-bin/webser?cmd=_payflow-recurring-billing-faq-outside, 3 pages.
Radding, A., "Generationg Revenue from Web Services—Six Vendors with the Right Tools," Jan. 20, 2003, retrieved from http://72.14.207.104/search?q=cache:W5EXBA4Lr54J:home.comcast.net/~alanradding/iaws.pdf+generating+revenue+from+web+services+radding&hl=en&gl=us&ct=clnk&cd=3, 4 pages.
Redhat.com, "Red Hat Announces Red Hat Enterprise Linuz Available on Demand on Amazon Elastic Compute Cloud," Nov. 7, 2007, retrieved Nov. 19, 2007, from http://www.redhat.com/about/news/prarchive/2007/amazon.html, 3 pages.
Sabre Travel Network, Sabre Travel Network Launches Web Services Capabilities for Agents, Jul. 28, 2003, retrieved Sep. 13, 2005, from http://phx.corporate-ir.net/phoenix.zhtml?c=73098&p=IROL-NewsText&t=Regular&id=435603&logo=logo03, 2 pages.
SalCentral, Subscription of Web Services, Oct. 5, 2003, retrieved Sep. 7, 2005, from http://web.archive.org/web/20031005075820/www.salcentral.com/salnet/wpsubws.htm, 5 pages.
SalCentral, The Napster of Web Services, Oct. 4, 2003, retrieved Sep. 7, 2005, from http://web.archive.org/web/200310041431406/www.salcentral.com/salnet/webservicesnapter.asp, 2 pages.
SalCentral, WSDL, SOAP and Web Services and Quality Assurance and promotion, Oct. 4, 2003, retrieved Sep. 7, 2005, from http://web.archive.org/web/20031004143940/www.salcentral.com/salnet/webservicewhat.asp, 2 pages.
SalCentral, WSDL, SOAP, Web Services Search Engine and Web Service Tracking, Oct. 11, 2003, retrieved Sep. 7, 2005, from http://web.archive.org/web/20031011101544/www.salcentral.com/salnet/webserviceswsdlne.asp, 1 page.
Samtani, G., et al., "Integration Brokers and Web Services—Will Web Services Support Be Just Another Feature?" Jan. 30, 2002, retrieved Aug. 2, 2005, from http://www.webservicesarchitect.com/content/articles/samtani03print.asp, 5 pages.
Schofield, J., "The Third Era Starts Here," *The Guardian*, May 29, 2003, retrieved Nov. 4, 2003, from http://www.guardian.co.uk/print/0.3858.4678440-110837.00.html, 3 pages.
Siddiqui, B., "UDDI Based Electronic Marketplaces—Easier Integration With UDDI and WSDL." Feb. 20, 2002. retrieved Aug. 2, 2005, from http://www.webservicesarchitect.com/content/articles/siddiqui02print.asp, 4 pages.
Sirin, E., et al., "Semi-automatic Composition of Web Services Using Semantic Descriptions," In *Web Services: Modeling, Architecture and Infrastructure workshop in ICEIS 2003*, Angers, France, Apr. 2003, from http://www.mindswap.org/papers/composition.pdf, 6 pages.
Smith, Rick, "Striking While the Iron is Red Hot: StrikeIron Unveils Its Web Network." *LocalTechWire*, Jun. 25, 2004, retrieved Sep. 22, 2005, from http://www.localtechwire.com/article.cfm?u=8509, 3 pages.
SoftwareMarkets.com, Frequently Asked Questions from Developers, Sep. 18, 2000, retrieved Sep. 8, 2005, from http://web.archive.org/web/20000918003355/www.softwaremarkets.com/info/faqdevs.html, 3 pages.
Sterling Commerce, Sterling Information Broker, retrieved Nov. 10, 2003, from http://www.sterlingcommerce.com/PDF/Solutions/Sterling/SC0040.InfoBrokerOver.6-02.pdf, 4 pages.
Sterling Commerce, Sterling Information Broker, retrieved Nov. 10, 2003, from http://www.sterlingcommerce.com/solutions/em/commerce/iibs.html, 3 pages.
StrikeIron, Inc., "StrikeIron Launches the Web Services Business Network," Jun. 23, 2004, retrieved Sep. 8, 2005, from http://www.strikeiron.com/news/si_launches.aspx, 3 pages.
StrikeIron, Inc., "StrikeIron Web Services Business Network Overview," retrieved Sep. 12, 2005, from http://strikeiron.com/doc/StrikeIronWebServicesBusinessNetworkOverview.pdf, 24 pages.
StikerIron, Inc., Frequently Asked Questions, retrieved Dec. 5, 2006, from http://www.strikeiron.com/info/faqs_p.aspx, 5 pages.
StrikeIron, Inc., What is Invoke Through Compensation, retrieved Dec. 5, 2006, from http://www.strikeiron.com/info/whatisinvokethrough.aspx, 3 pages.
Taft, Darry K., "Start-Up Presents ASP Opportunity For Java Developers," CRN, Jul. 31, 2000, retrieved Sep. 20, 2005, from http://www.crn.com/sections/breakingnews/breakingnews.jhtml?articleId=18834381, 3 pages.
Tolksdorf, R., et al., "A Web Service Market Model Based On Dependencies," retrieved Sep. 9, 2005, from http://www.wiwiss.fu-berlin.de/suhl/bizer/pub/p49-tolksdorf.html, 4 pages.
Unisys, Web Service Marketplace, retrieved Nov. 4, 2003, from http://www.unisysfsp.com/default.aspx?catID+16, 2 pages.
W3C, "WS Choreography Model Overview," Mar. 24, 2004, retrieved Sep. 8, 2005, from http://www.w3.org/TR/2004/WD-ws-chor-model-20040324/, 35 pages.
Waldspurger C. A. et al., "Spawn: A Distributed Computational Economy," May 1989, Xerox Palo Alto Research Center, pp. 1-32, 32 pages.
Web Services Architect, Web Services Resources, retrieved Nov. 6, 2003, from http://webservicesarchitect.com/resources.asp, 6 pages.
WestGlobal mScape™, web Services Business Management System, retrieved Nov. 7, 2003, from http://www.westglobal.com/downloable_media/mscape_literature.zip, 20 pages.
Westglobal, Products—Overview, retrieved Nov. 7, 2003, from http://www.westglobal.com/products/mscape_overview.htm, 3 pages.
Westglobal, Products—Revenue Management Module, retrieved Nov. 7, 2003, from http://www.westglobal.com/products/mscape_revman.htm, 3 pages.
Xmethods website, retrieved Nov. 6, 2003, from http://www.xmethods.net/, 3 pages.
ZapThink, LLC, ZapThink Briefing Note—Oct. 8, 2002, retrieved Nov. 7, 2003, from http://www.grandcentral.com/assets/docs/GC.zapthink_report.pdf, 5 pages.
Gonsalves, A., "Amazon Launches Premium Support for EC2 Developers," Information Week, Apr. 17, 2008, retrieved on Apr. 17, 2008, from http://www.informationweek.com/shared/printableArticleSrc.jhtml?articleID=207400320, 1 page.
Amazon Web Services, "Amazon Web Services Premium Support (AWS Premium Support)," retrieved on Apr. 17, 2008, from http://www.amazon.com/b/ref=sc_fe_c_1_13833841_1?ie=UTF8&node=566801011&no=138338 . . . , 3 pages.
Nirvanix, "Getting Started," retrieved on Apr. 17, 2008, from http://www.nirvanix.com/gettingStarted.aspx?=homecontent, 2 pages.
Wikipedia, "Digital Rights Management," retrieved on Dec. 23, 2010, from http://en.wikipedia.org/wiki/Digital rights management, 20 pages.
"Rogue Wave Wraps Standard C++ Library With Tools.H++ V7.0." Mar. 18, 1996, retrieved on Dec. 23, 2010 from http://thefreelibrary.com/ROGUE+WAVE+WRAPS+STANDARD+C%2B%2B+LIBRAR . . . , 3 pages.
Wikipedia, "Floating Licensing," retrieved on Mar. 22, 2011, from http://en.wikipedia.org/wiki/Floating_licensing, 1 page.

(56) References Cited

OTHER PUBLICATIONS

Wikipedia, "License Manager," retrieved on Mar. 22, 2011, from http://en.wikipedia.org/wiki/License manager, 1 page.
Wikipedia, "Code Signing," retrieved on Mar. 22, 2011, from http://en.wikipedia.org/wiki/Code signing, 3 pages.
Wikipedia, "Software Protection Dongle," retrieved on Mar. 22, 2011, from http://en.wikipedia.org/wiki/Dongle, 5 pages.

* cited by examiner

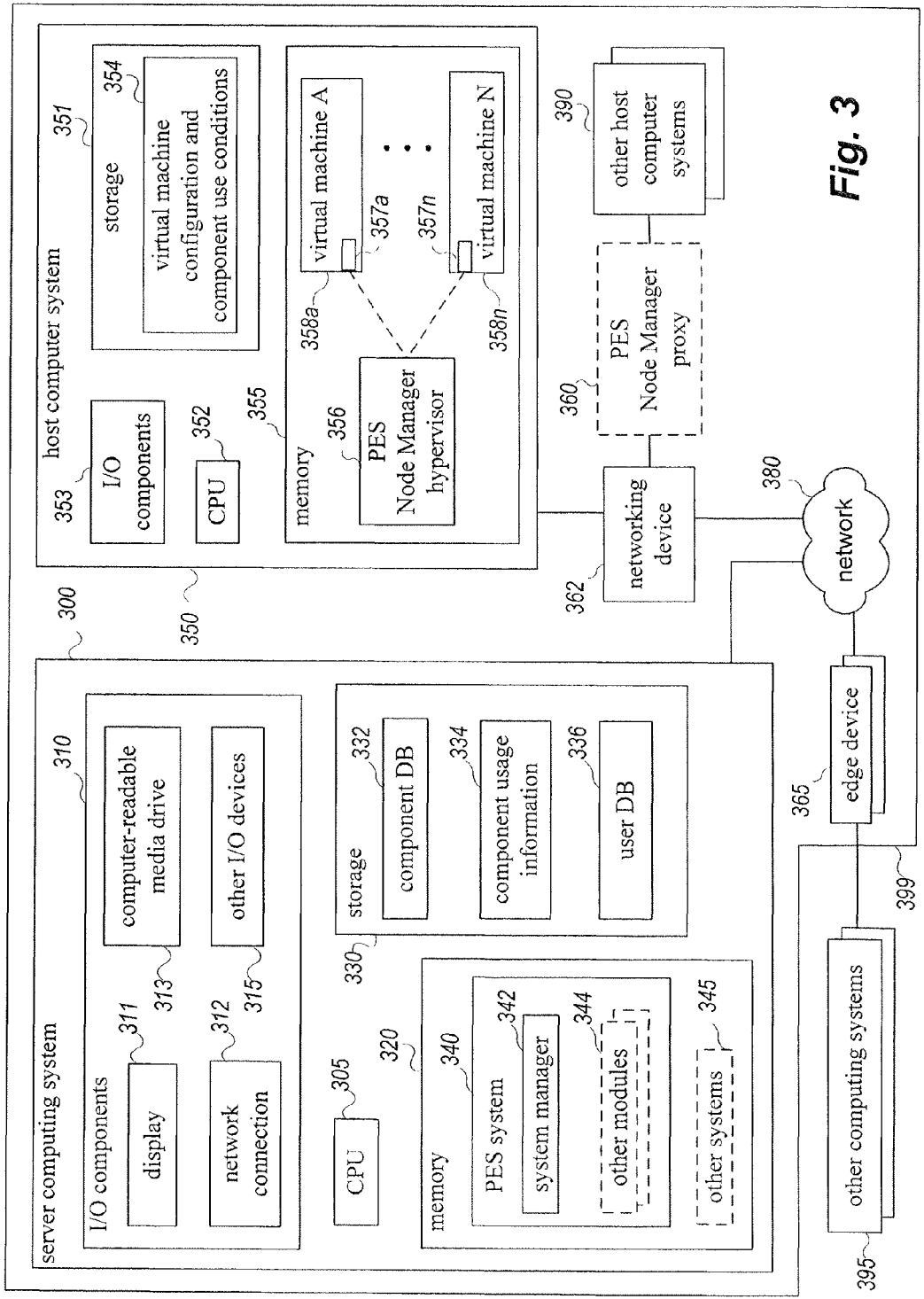

VIRTUALIZED ADMINISTRATION OF SOFTWARE USE AUTHORIZATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of co-located interconnected computing systems have become commonplace, such as private data centers that are operated by and on behalf of a single organization, and public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by XEN, VMWare, or User-Mode Linux may allow a single physical computing system to be shared among multiple users by providing each user with one or more virtual machines hosted by the single physical computing system, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIG. 3 is a block diagram illustrating example computing systems suitable for execution of an embodiment of a program execution service system that manages use of software components.

DETAILED DESCRIPTION

Figure 1:
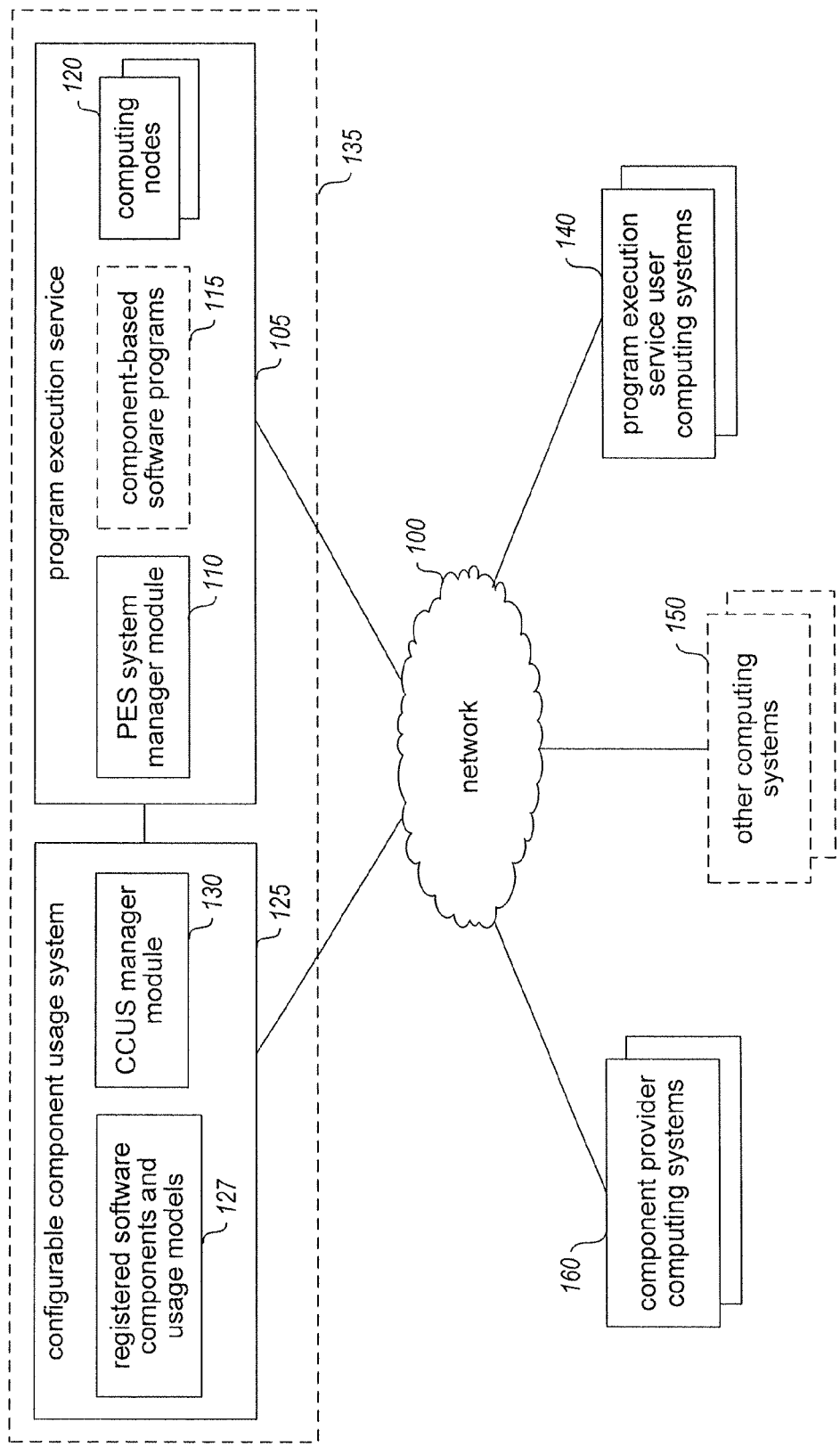
FIG. 1 is a network diagram illustrating an example embodiment of interactions to manage use of software components.

Techniques are described for managing software whose use is restricted in one or more manners. Such use restrictions may in some embodiments include fee-based conditions for use of associated software (e.g., payment of one or more specified fees), and in some embodiments may include various non-fee-based conditions for use of associated software (e.g., restrictions on use of a single copy of the software at a time, restrictions on use of software for a specified amount of time, etc.). In at least some embodiments, particular use conditions are associated with particular software components whose use is restricted, and the execution of software programs that include such restricted software components is managed in one or more manners. Such software components may, for example, be fee-based components that are made available by providers of the components for use by others in exchange for fees defined by the component providers, and each software component may have an associated usage model that is specified by its provider and that indicates one or more fee-based use conditions and/or one or more non-fee use conditions. Various types of software components and associated use conditions may be provided and used in various embodiments, as discussed in greater detail below.

In addition, in at least some embodiments, the execution of software programs that include restricted software components is managed by an automated system that provides a program execution service, with the program execution service managing execution of various programs for various users of the program execution service. The program execution service may perform various operations to further manage the use of any such restricted software components that are part of or otherwise included in the software programs being executed for users. For example, in at least some embodiments, the program execution service uses various physical computer systems that each host one or more virtual machines, with each of the virtual machines being treated as a distinct computing node by the program execution service that is configurable to execute one or more software programs for a particular user of the program execution service. The described techniques include the program execution service providing for each of its computing nodes an associated node manager module that monitors operations of the computing node, including to determine whether a software component included in executing software on an associated computing node is authorized to provide one or more types of functionality as part of the executing software. In at least some embodiments in which a computing node is a virtual machine hosted on a physical computer system, the node manager module may be implemented as part of a hypervisor program executing on the physical computer system to manage operations of the physical computer system's hosted virtual machine. In at least some such embodiments, an operator of the program execution service, a user of the program execution service, and a provider of a software component being used as part of software being executed for the user by the program execution service may all be distinct entities that are unaffiliated with each other except for the respective commercial transactions involving two or more of the entities, such as if the software component provider is a third-party vendor of software.

Furthermore, the management of operations of a virtual machine computing node may include configuring a virtual computer port or other virtual interface for the virtual machine that a restricted software component may query to verify authorization to provide functionality, with the associated node manager module for the virtual machine obtaining and responding to messages sent to the virtual interface.

For example, if a software program that is being executed by a program execution service for a user on a virtual machine computing node includes a restricted software component (e.g., a software component provided by a third party distinct from the user and the program execution service), the software component may attempt to determination authorization for its use at various times, such as when the software program begins to execute, when the software program attempts to access functionality from the software component, periodically while the software component is being used, etc. In particular, the included restricted software component may query the virtual interface to determine whether the software component is authorized to currently provide the functionality, such as based on the user having paid for use of the software component or otherwise satisfied the use conditions for the software component. In at least some such embodiments, the virtual interface may represent access to a hardware protection dongle that is used on some physical computer systems to verify that an operator of the physical computer system is an authorized user of restricted software (e.g., that the copy of the restricted software on the physical computer system is an authorized copy), such as hardware protection dongles that are expected to be attached to particular hardware ports of the physical computer system (e.g., a USB (or "Universal Serial Bus") serial port, a non-USB serial port, a parallel port, etc.). When the node manager module that is part of the hypervisor program for the virtual machine receives such an authorization request from an included restricted software component via a virtual interface, the node manager module may perform various operations to determine whether to confirm authorization to the software component to provide particular functionality, as discussed in greater detail below.

FIG. 1 is a network diagram that illustrates an example of an automated system 105 that provides a program execution service that manages execution of software programs for users on various available computing nodes, including for component-based software programs that each use one or more software components from providers other than the users who execute the software programs. FIG. 1 further illustrates an example of a configurable component usage system 125 that assists in providing software components for use by software programs being executed by the program execution service system 105. In the illustrated embodiment, the program execution service system 105 and the configurable component usage system 125 are integrated together into a single system 135 (e.g., provided by a single entity, not shown), but in other embodiments may have other forms (e.g., being separate systems operated by separate entities, being in the form of a single system that includes at least some of the described functionality of both the program execution service and the configurable component usage system, etc.). In addition, for illustrative purposes, some examples and embodiments are described below in which specific types of software components and software programs are provided, managed and executed in specific manners. Furthermore, while execution of a single software program having multiple portions or pieces is discussed in some examples, it will be appreciated that such descriptions similarly apply to groups of two or more software programs that are designed or configured to inter-operate, as well as to a single software program that is executed in a distributed manner by executing multiple copies of the software program that inter-operate or otherwise each perform a subset of the total functionality that is provided by the software program. In addition, while in some embodiments a software program may include and use a software component, in other embodiments a software program may include and use multiple distinct software components and/or may include a software component but not use some or all of its functionality during at least some times (e.g., not use premium features of a software component unless a user separately purchases or otherwise gains access to such premium features). Furthermore, in some embodiments and situations, an executing software program that includes a software component may in fact be the included software component if the software component is a stand-alone program that can execute on its own. These examples are provided for illustrative purposes and are simplified for the sake of brevity, and it will be appreciated that the inventive techniques may be used in a wide variety of other situations, only some of which are described below.

In the example of FIG. 1, various component provider users (not shown) use various client component provider computing systems 160 to interact over a network 100 with the configurable component usage system 125, which is provided by one or more other configured computing systems (not shown). In this example, at least some of the functionality of the configurable component usage system 125 is provided by a CCUS ("configurable computing usage system") manager module 130 of the configurable component usage system 125, and other related functionality may optionally be provided by other modules (not shown) of the configurable component usage system 125. In particular, the various component provider users interact with the module 130 in order to provide software components that are available for use with component-based software programs, including to supply at least one usage model for each software component being provided. As discussed in greater detail below, each usage model associated with a software component may optionally specify one or more price conditions related to use of the software component (e.g., usage-based prices that correspond to a specified cost for a specified amount of use of the software component), and may optionally specify one or more non-price conditions related to use of the software component (e.g., geographical restrictions on where the software component may or may not be used, allowed or disallowed types of uses, etc.). After the module 130 receives the various information for a particular software component, the module 130 registers the software component as being available for use by third-party software programs, including to store information 127 that includes the associated usage model(s) and information on how to access the software component (e.g., by obtaining and storing a copy of the software component, by obtaining and storing information about a network-accessible location from which the software component may be retrieved when desired, etc.). The module 130 may also optionally provide information to one or more other systems (e.g., the program execution service system 105) about the registered software components at various times and in various manners (e.g., by pushing some information to another system periodically or at other times, such as upon registration of a software component; by providing information to another system upon request; etc.).

In the example of FIG. 1, various other users (not shown) are also using various client computing systems 140 to interact over the network 100 with the program execution service system 105, which is provided by one or more other configured computing systems (not shown). In this example, at least some of the functionality of the program execution service is provided by a PES ("program execution service") manager module 110 of the program execution service system 105, and other related functionality may optionally be provided by other modules (not shown) of the program execution service. In particular, the various other users interact with the module 110 in order to specify information about component-based software programs to be executed by the program execution service that each use one or more third-party software components, such as one or more software programs 115 that may optionally be made available by the program execution service for use by various users or instead supplied by particular users of the program execution service for their own use. In some embodiments, a user of the program execution service may designate a software program to be executed that already includes one or more software components (e.g., a software program that is created by the user, or that is instead created by a third-party, including in some situations by the third-party provider of one or more software components included in the software program), such as if those one or more software components are integrated as part of the software program, and in some embodiments a software program being executed for a user may dynamically incorporate software components during the execution (whether automatically based on operations of the software program, or in response to manual instructions from the user, including explicit instructions to incorporate a particular software component or instead instructions to provide functionality that is available from a corresponding software component). Some or all of the software components used by the software programs may be software components registered with the configurable component usage system 125, although in some embodiments other external software components may be used (e.g., other optional software components, not shown, that are available over the network 100 from optional other computing systems 150). As part of preparing a software program for execution, the module 110 may, for example, enable particular users to specify quantities of computing nodes to be used in the execution of a software program and/or to specify particular portions of the software program (e.g., particular objects, modules, or functions within the software program) to be executed together with or separate from other such software program portions, although in other embodiments the program execution service may instead automatically determine some or all such information without such user input.

In this example, the program execution service also makes various computing nodes 120 available for executing software programs, although in other embodiments at least some of the computing nodes used for such execution may be provided in other manners (e.g., made available by the users of the client systems 140 or by other users on whose behalf execution of a software program is performed; made available by other third-party entities, such as via optional external computing systems 150; etc.). As discussed below, in at least some embodiments, some or all of the computing nodes used to execute software programs for the program execution service may each be a virtual machine hosted on a physical computer system, and the program execution service may incorporate a node manager module in an executing hypervisor program for the physical computer system to manage authorization for use of restricted software components included in the executing software programs, such as by providing virtual interfaces to the virtual machine computing nodes that the node manager modules may access and send appropriate responses to queries from included software components on those virtual machine computing nodes. In addition, one or more modules of the program execution service may assist in continuously or repeatedly monitoring a computing node that is in use executing a software program, whether an associated PES node manager module or other PES module, including to determine amounts of use to enable fees to be determined for using particular software components and/or to determine whether particular non-price conditions associated with particular software components are satisfied.

The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users, such as if the systems 105 and/or 125 are provided to support users of that private network. In still other embodiments, the network 100 may include one or more private networks with access to and/or from the Internet. In the illustrated embodiment, the modules 110 and 130 (and any other modules, not shown) may each include software instructions that execute on one or more computing systems (not shown) to program or otherwise configure those computing systems to perform some or all of the described techniques, and the systems that include those modules similarly may include those software instructions and optionally other software instructions. In addition, the modules and various computing nodes 120 may be provided in various manners, such as at a single data center or otherwise to use a group of co-located computing systems, or instead in a distributed manner using various computing systems in various distinct geographical locations.

In some embodiments, the illustrated computing nodes 120 may include multiple physical computing systems and/ or multiple virtual machines that are hosted on one or more physical computing systems. Each of the computing nodes 120 has some amount of computing resources available for executing one or more programs, which provide a specific amount of program execution capacity, such as may be measured, for example, by a quantity of one or more such computing nodes and/or by a combination of one or more of processing capacity (e.g., number and/or size of processing units), memory capacity, storage capacity, network bandwidth capacity, etc. In some embodiments, preconfigured computing nodes may be used, with each preconfigured computing node having equivalent or otherwise similar amounts of resources available for executing programs on behalf of users, while in other embodiments, a selection of various different computing nodes having varying amounts and/or types of computing resources (e.g., size, speed and/or type of processing units; number of processing units; amount of memory and/or storage; platform configuration, such as 32-bit or 64-bit; etc.) may instead be used. Furthermore, when computing nodes vary based on geographical location and/or other characteristics, particular computing nodes may be chosen and used to execute a particular software program for various reasons, including to satisfy conditions of any software components that are used as part of the software program.

In this illustrated embodiment, after a component-based software program is available to be executed (whether based on being previously generated by an application creator user, or dynamically generated at least in part by adding one or more software components to a software execution environment), a user may interact with the program execution service to initiate execution of the software program using one or more computing nodes 120—in some embodiments and situations, the interactions to initiate execution of a software program may occur as part of the same interactions to generate the software program, while in other embodiments and situations the interactions to initiate execution of the software program may occur at later times. After a request is received from a user to execute a software program, the module 110 may determine whether there are a sufficient number of computing nodes 120 with available resources for satisfying the request, and if so, the module 110 may initiate execution of the software program on an appropriate quantity of one or more of the computing nodes on behalf of the user. In some embodiments and situations, the program execution service will select one or more particular computing nodes for the execution of a software program, including to satisfy any specified conditions for any software components used by the software program (e.g., conditions related to geographical locations of the computing nodes executing such software components and/or of computing nodes receiving output generated by such software components). The managing of the execution of the software program on one or more computing nodes may also include automated operations by the program execution service to prepare those computing nodes, including to provision each of the computing nodes appropriately (e.g., to configure the computing node to provide a virtual computer port or other virtual interface for use by a restricted software component in verifying authorization to provide restricted functionality; to load at least a portion of the software program on each computing node, optionally including one or more software components used by the software program, such as if that portion of the software program is not already loaded on the computing node; etc.), as well as to initiate execution on each of the computing nodes of the portion of the software program that is loaded on the computing node. In at least some embodiments, the program execution service manages the entire execution lifecycle of the software program, including to shutdown or release the use of computing nodes after execution has completed on those computing nodes, to optionally temporarily pause the execution of particular software on particular computing nodes (e.g., while waiting for data or for other reasons), to optionally monitor the execution on each computing node (e.g., to track an amount of use of particular software components, to verify that any conditions associated with particular software components are satisfied during execution, etc.), and to optionally restart or replace computing nodes that fail or otherwise become unavailable before their software execution is complete.

In addition, in some embodiments, the program execution service may take additional actions to determine one or more fees to charge a user for executing a software program, and optionally obtain payment from the user for those fees, whether before or after the execution is performed. For example, a user may be charged various fees to use a software component during execution of a software program by the program execution service, such as based on a number of copies of the software component that are used, a duration of time that the software component is used, particular operations that the software component performs (e.g., data transfer and/or storage), particular features or functionality of the software component that are used (e.g., premium functionality having an associated fee separate from one or more other fees for accessing other functionality of the software component), etc. Similarly, a user may in some embodiments be charged various other fees in association with use of the program execution service to execute a software program, such as based on a number of computing nodes used, a type of computing node used, a duration of time the computing nodes are used, particular operations that the computing nodes perform (e.g., data transfer and/or storage), particular functionality or features provided by the program execution service, etc.

After a group of one or more computing nodes is provided for use in executing a software program on behalf of a user, the computing node group may be further managed in various manners in at least some embodiments. For example, as previously noted, the PES system manager module 110 may optionally monitor the computing nodes of the group, such as to determine performance characteristics of some or all of the computing nodes, including an actual computing node quantity or other measure of actual program execution capacity being provided by the computing nodes of the group. The actual program execution capacity of the group may change if, for example, one or more of the computing nodes fail or otherwise become unavailable, and in at least some embodiments, the program execution service may perform various operations to maintain the program execution capacity of the computing node group in such situations (e.g., by initiating the addition of replacement computing nodes to the group in place of the unavailable computing nodes).

Although the foregoing example embodiment of FIG. 1 is described with respect to a program execution service that provides various types of functionality for various users in conjunction with an associated configurable component usage system, it will be appreciated that various other embodiments may exist. For example, in at least some embodiments and situations, some users or other entities may serve multiple roles. For example, a user of a client computing system 140 may also act as a provider of one or more software components that are available for use by other users. As another example, in some embodiments, the entity providing the configurable component usage system and/or program execution service may also create and provide one or more software components. In addition, some of the users may represent an organization or other group (e.g., a company) instead of an individual.

Figure 2:
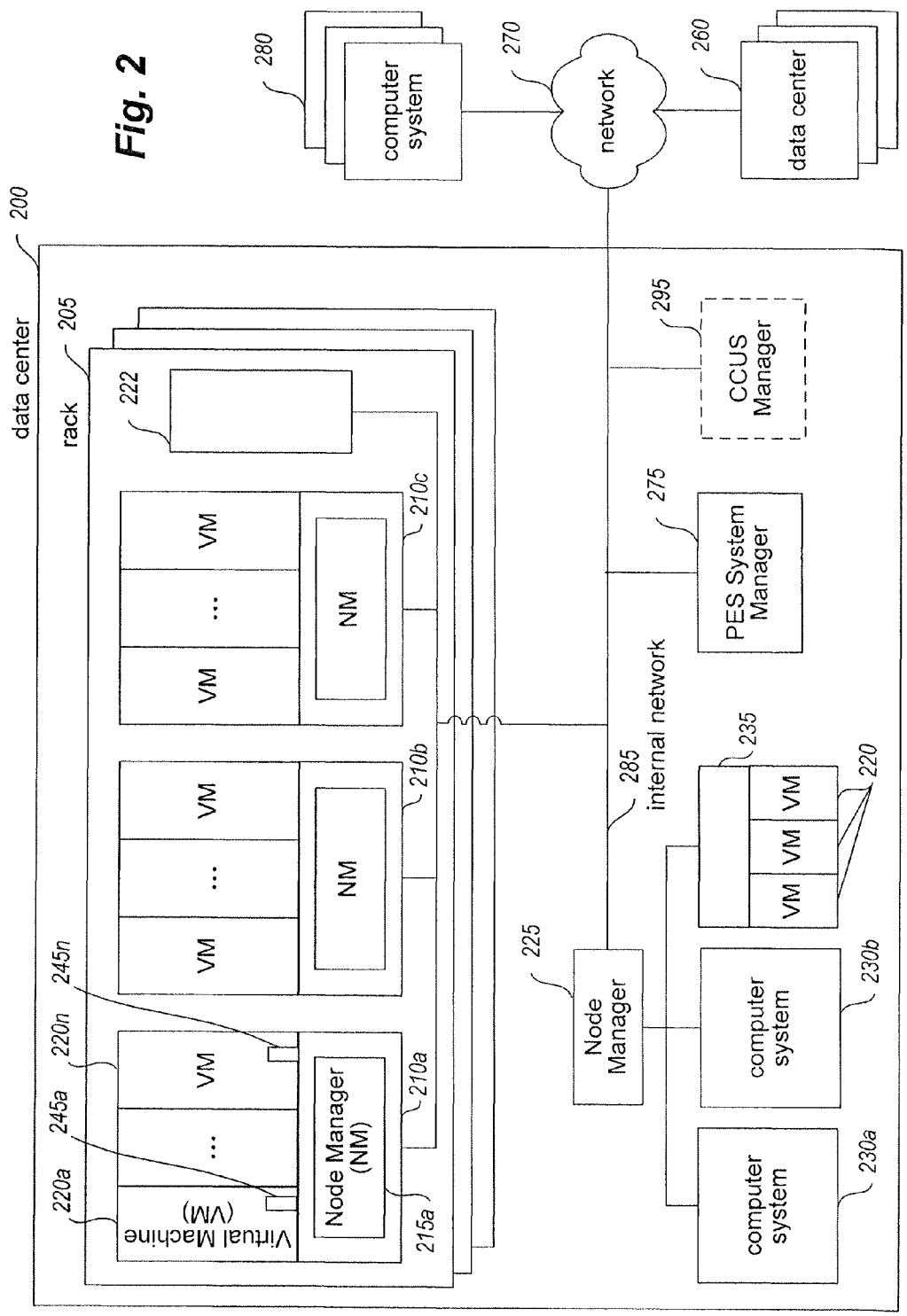
FIG. 2 is a block diagram illustrating an example embodiment in which various computer systems and other hardware interoperate to manage use of software components.

FIG. 2 is a block diagram illustrating an example embodiment in which various physical computer systems and related hardware interoperate to execute software programs that include software components, such as under the control of a program execution service. This example embodiment illustrates one non-limiting example of various computer systems that may be used to provide the program execution service system 105 of FIG. 1, and optionally the configurable component usage system 125 of FIG. 1. In particular, in this example, a program execution service manages the execution of software on various host computer systems located within a data center 200. Multiple remote systems external to the data center may also be used in various manners, such as to store copies of at least some software programs and/or software components that are executed by the host computer systems of the data center 200.

In this example, data center 200 includes a number of racks 205, and each rack includes a number of host computer systems, as well as an optional rack support computer system 222 in this example embodiment. The host computer systems 210a-c on the illustrated rack 205 each host one or more virtual machines 220 in this example, as well as a distinct Node Manager module 215 associated with the virtual machines on that host computer system to manage operations of those virtual machines. One or more other host computer systems 235 also each host one or more virtual machines 220 in this example, although less details are illustrated for the host computer systems 235. Each virtual machine 220 may act as an independent computing node for executing software (not shown) for a user (not shown), such as a customer of the program execution service. In addition, this example data center 200 further includes additional host computer systems 230*a-b* that do not include distinct virtual machines, but may nonetheless each act as a computing node for one or more programs (not shown) being executed for a user. In this example, a Node Manager module 225 executing on a computer system (not shown) distinct from the host computer systems 230*a-b* and 235 is associated with those host computer systems to manage the computing nodes provided by those host computer systems, such as in a manner similar to the Node Manager modules 215 for host computer systems 210—the computer system executing the Node Manager module 225 may, for example, operate as a proxy device for the host computer systems 230*a-b* and 235, or may otherwise have access to communications sent by those host computer systems. The rack support computer system 222 may provide various utility services for other computer systems local to its rack 205 (e.g., long-term program storage, metering and other monitoring of program execution, etc.), as well as possibly to other computer systems located in the data center. Each computer system 210, 230 and 235 may also have one or more local attached storage devices (not shown), such as to store local copies of programs and/or data created by or otherwise used by the executing programs, as well as various other components.

In this example, an executing PES System Manager module 275 for the program execution service is also illustrated, although the one or more computer systems executing the module 275 are not illustrated—in some embodiments, the module 275 may be provided using a single computer system, while in other embodiments the module 275 may be provided in a distributed manner using multiple computer systems. An optional executing CCUS Manager module 295 for an embodiment of a configurable component usage system is also illustrated, although in other embodiments the configurable component usage system may be provided in another location outside of data center 200, such as by an entity that is unrelated to an operator of the program execution service. The executing PES System Manager module 275 performs various operations to manage the execution of programs on the computing nodes provided by the host computer systems located within the data center 200 (or optionally on computer systems located in one or more other data centers 260, or other remote computer systems 280 external to the data center). As discussed in greater detail elsewhere, a PES System Manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES System Manager module may also coordinate with the Node Manager modules 215 and 225 to manage program execution on computing nodes associated with the Node Manager modules, such as by supplying information to the Node Manager modules for use in determining whether software components included in software executing on particular associated computing nodes are authorized to perform various types of functionality.

The program execution service may further perform various operations to enable restricted software components included in software executing on the computing nodes to request and obtain information about authorization of the restricted software components to provide functionality. In particular, the restricted software components may each be designed or otherwise configured to expect the presence of a particular type of computer port or other software-accessible interface on a computing node that executes the software component, to enable the restricted software component to query that computer port or other interface to verify that the user who is executing the software component is authorized to do so. For example, some or all such restricted software components may attempt to access a hardware protection dongle via a particular type of computer port, such as a hardware copy protection dongle expected to be attached to a USB serial port or other computer port. In other embodiments, a software-accessible interface may include a specified IP ("Internet Protocol") address or other network address that some or all restricted software components attempt to contact to query for authorization, such as a software-accessible interface that represents a remote query authorization service. In addition, the restricted software components may use a defined API ("application programming interface") when accessing a computer port or other accessible interface, such as to send and receive one or more defined types of messages using a defined data format, defined data content, defined communication protocols, etc. Furthermore, in at least some embodiments and situations, an interface that is provided and available for use by a restricted software component to verify authorization to execute may also be used for other purposes and/or by other software, such as if a software program that includes the restricted software component accesses the provided interface to request other types of information of interest from a service that provides such information (e.g., as part of additional functionality provided by Node Manager modules or otherwise by a program execution service).

In order to enable the restricted software components to obtain access to such expected authorization information, the program execution service in this example provides and manages virtual interfaces for some or all of the computing nodes. For example, the Node Manager modules 215 on the host computer systems 210 may each be part of hypervisor software or other virtual machine monitor software that executes on those host computer systems to manage operations, and as such may have access to requests made from the virtual machine computing nodes to computer ports or to network addresses. The Node Manager 225 may similarly have access to at least some such requests made by computer systems 230 and 235. With respect to the illustrated example, the program execution service may perform various operations to configure each virtual machine computing node 220 with one or more virtual interfaces 245, such as to configure each virtual machine computing node with one or virtual computer ports 245—such configurations may be performed, for example, by the associated Node Manager module 215 and/or by the System Manager module 275. In this example, virtual interfaces 245*a* and 245*n* are shown for virtual machine computing nodes 220*a* and 220*n*, respectively, although some or all of the other computing nodes may similarly have access to virtual interfaces that are not shown. Each Node Manager module 215 and/or 225 may also be configured in one or more manners to support the virtual interfaces of their associated computing nodes, such as based on configuration operations performed by the System Manager module 275 and/or by the Node Manager modules themselves. For example, if a virtual interface includes a specified IP address or other network address, the Node Manager modules may be configured to intercept messages sent to such a network address, and to formulate and provide appropriate responses rather than forwarding such messages on to other remote computing systems. Similarly, if a virtual machine computing node sends a message to a provided virtual computer port interface, the associated Node Manager module may be configured to receive and respond to such messages. The Node Manager modules may further be configured to support one or more APIs corresponding to the virtual interfaces, such as to use particular data formats, data content, and/or communication protocols. In other embodiments and situations, an interface that is provided may not be virtual, such as if a physical computer port or other interface (not shown) on physical computer system 230*a* is used by a restricted software component on physical computer system 230*a* to query that interface to verify that the user who is executing the software component is authorized to do so, but with the Node Manager module 225 nonetheless being able to intercept and handle such queries.

The Node Manager modules may also be configured in various manners to support responding to authorization-related requests from restricted software components on associated computing nodes via provided virtual interfaces, and the Node Manager modules may further perform various operations as part of responding to such authorization-related requests. For example, in some embodiments and situations, a determination may be made by the program execution service at a single time regarding whether the functionality of a software component included in executing software for a user on a computing node is authorized, such as when the execution of the software is initiated or when an attempt is made to first access functionality of the included software component, and the Node Manager module associated with that computing node may be configured at that time to either statically authorize or not authorize the use of that functionality of that software component for that computing node for the duration of its use (or until the authorization is explicitly changed). As one example, the program execution service may determine that a user is authorized to access functionality of a software component included in a software program when the program execution service first initiates the execution of the software program, and if so may configure the Node Manager module associated with the computing node being used to authorize use of that software component for that computing node—such a determination by the program execution service may be made, for example, based on interactions of the user with the program execution service to purchase access to the software component or to otherwise indicate that use conditions associated with the software component are satisfied. As another example, the user may interact with the provider of a software component in a manner external to the program execution service, and the provider may notify the program execution service that the user is authorized for a particular type of use of the software component (e.g., for a specified number of copies of the software component at a time, for specified features of the software component, etc.), with the program execution service then making corresponding configurations of one or more Node Manager modules associated with computing nodes executing software for the user that includes the software component—such interactions between the user and the provider may occur before the execution of the corresponding software begins (e.g., if the user purchases a copy of the software component or purchases a subscription to use the software component) or during the execution of the corresponding software (e.g., if the user decides to interactively purchase access to use the included software component or particular features of the component, such as premium features, including in some situations by interacting with the provider via the software component to purchase that access). In addition, if the use conditions for a software component include one or more non-fee-based conditions that do not vary during execution for a user on a particular computing node of software that includes the software component (e.g., based on a geographical location, if the host computer system is stationary; based on a type of the computing node, such as to reflect an amount of computing-related resources available to the computing node; based on a type of the executing software; based on non-changing information about the user; etc.), the associated Node Manager module may similarly be configured to reflect whether or not that computing node and its executing software for the user are authorized to access functionality of the software component based on whether or not those non-varying conditions are satisfied, such as by the System Manager module 275 when the execution of the software on the computing node is initiated.

In addition, if the use conditions for a software component include one or more conditions that may vary during execution of corresponding software for a user on a particular computing node, the program execution service may perform additional operations to support authorization determinations for use of the software component. As one example, a Node Manager module associated with such a computing node or another module of the program execution service may track changing conditions to enable a determination as to whether the use of the software component is currently authorized at a given time (e.g., in response to periodic or otherwise repeated authorization requests from the software component via a provided virtual interface), and may use such tracked information and optionally information about the user and/or software being executed on the computing node to make corresponding authorization determinations. Such changing conditions may include conditions that are specific to the executing software and/or included software component, conditions that are not specific to the executing software and/or included software component, or both—such changing conditions may include, for example, a current time (e.g., if the software component is only authorized to be used at particular times), a current length of use of the software component on the computing node (e.g., if the software component is only authorized to be used for a specified amount of time), a current quantity of copies of the software component that are in use by the user via the program execution service (e.g., if the user is authorized to concurrently use only a specified quantity of copies of the software component), a current amount of resources used by the software component (e.g., if the use of the software component is only authorized for a specified amount of resource usage), etc. If the Node Manager module associated with such a computing node having an included software component performs the authorization determinations, the Node Manager module may be configured with information about the use conditions for the software component and optionally information about the user and/or software being executed on the computing node for use in the authorization determinations. In addition to or instead of having changing conditions that may affect whether a software component's use conditions are satisfied at particular times, the actual use conditions for a software component may be dynamically changed while the software component is in use in at least some embodiments and situations (e.g., in response to instructions from the provider or the program execution service, such as to enable live control of the software component), and the determination of whether use of the software component is authorized may similarly change based on such changing use conditions. In other embodiments, the Node Manager modules may instead merely receive authorization-related requests from associated computing nodes, forward such authorization-related requests to an external module or system (e.g., to the System Manager module 275 of the program execution service; to a remote system outside of the data center 200, such as a third-party system executing on one or more of the computer systems 280 that is not operated by the operator of the program execution service; etc.), receive corresponding responses from the external module or system, and forward those responses to those associated computing nodes.

In this example, the various host computer systems 210, 230 and 235, computer systems 222 and 225, and other computer systems executing modules 275 and 295 are interconnected via one or more internal networks 285 of the data center, which may include various networking devices (e.g., routers, switches, gateways, etc.) that are not shown. In addition, the internal networks 285 are connected to an external network 270 (e.g., the Internet or other public network) in this example, and the data center 200 may further include one or more optional devices (not shown) at the interconnect between the data center 200 and an external network 270 (e.g., network proxies, load balancers, network address translation devices, etc.). In this example, the data center 200 is connected via the external network 270 to one or more other data centers 260 that each may include some or all of the computer systems and storage systems illustrated with respect to data center 200, as well as other remote computer systems 280 external to the data center. The other computer systems 280 may be operated by various parties for various purposes, such as by the operator of the data center 200 or third parties (e.g., customers of the program execution service). It will be appreciated that the example of FIG. 2 has been simplified for the purposes of explanation, and that the number and organization of host computer systems and other systems and devices may be much larger than what is depicted in FIG. 2. For example, as one illustrative embodiment, there may be approximately 4000 computer systems per data center, with at least some of those computer systems being host computer systems that may each host 15 virtual machines. If each hosted virtual machine executes one software program, then such a data center may execute as many as sixty thousand program copies at one time. It will be appreciated that in other embodiments, other numbers of computer systems, programs and volumes may be used.

Thus, the use of the described techniques by a program execution service to make authorization determinations related to the use of a software component may provide various benefits in various embodiments. As one example, a restricted software component may be configured to operate in the same manner whether executing directly on a physical computer system or on a virtual machine computing node, based on actions of the program execution service to virtually implement an interface available to the software component on a virtual machine computing node, and with the responses sent back to the software component via the provided virtual interface being transparent as to whether they are initiated by a physical hardware protection dongle or by a corresponding software service of the program execution service. In addition, because the program execution service is an independent party from a user on whose behalf software is executed, the provider of a software component included in such executing software may trust the program execution service to only provide use authorizations in appropriate situations, and thus prevent any attempts by users to make unauthorized use of their software components. Moreover, by enabling the use of information about changing conditions as part of the authorization determination, the described techniques enable the program execution service to make various types of authorization determinations that are not available using only a physical hardware protection dongle.

A non-exclusive list of additional functionality that may be provided by a program execution service as part of its authorization determinations for software components include the following: use verification, such as to verify that a particular software component is used by a particular user at particular times (e.g., based at least in part on one or more authorization determination requests and/or other information supplied by the software component via a provided virtual interface); management of multiple authorized copies of a software component (e.g., to verify that at most a specified quantity of copies of a software component are in concurrent use), or more generally, management of a total specified amount of use by one or more software component copies; live monitoring, such as to dynamically provide information to a user about ongoing use of one or more software components by the user, and/or to dynamically provide information to a software component provider about ongoing use of a software component by one or more users; premium feature use, such as to enable particular features of a software component to be individually purchased or otherwise accessed at different times so that the software component provides corresponding functionality; etc.

In addition, in some embodiments, the program execution service may perform further operations to enhance the authorization determinations. For example, messages that are sent and/or received via provided virtual interfaces may be encrypted in one or more manners in order to provide assurance to an executing software component that a received confirmation of authorization is legitimate. As one example, a provider of a software component may configure the software component to include the public key of an encryption key pair for the program execution service, whether when the software component is originally designed or when provided to a user or program execution service for execution—if so, the Node Manager module or other PES module may encrypt a response being sent to the software component via a provided interface with the program execution service's private key, to provide a digitally signed response to the software component that the software component is able to verify was sent by the program execution service. The Node Manager module or other PES module may also use a cryptographic credential (e.g., a credential issued by a trusted third party, such as a credential service) as part of the response sent to a software component via a provided interface in some embodiments, such as a digitally signed credential, to provide assurance to the software component that the response was sent by the program execution service. In addition, when a software component is authorized for use by a user, a copy of the software component and a Node Manager module associated with a corresponding computing node may be configured with one or more encryption keys specific to the user, to verify that a particular use is on behalf of the authorized user. It will be appreciated that various related encryption techniques may be used in various combinations to verify various information of interest. Furthermore, in some embodiments, a challenge-response authentication protocol may be used for at least some requests and/or responses sent via a provided interface between a software component and the program execution service, in order to provide assurance to one or more of the software component and the program execution service of the identity of the other. Moreover, in some embodiments, a software component may further assure the identity of the responder and the accuracy of an authentication response by providing data as part of an authentication request and having the Node Manager module performing processing on that data in order to generate additional data that is provided by the Node Manager module with the authentication response, and with the software component further using that generated additional data as part of its ongoing operation or otherwise verifying the accuracy of the generated additional data—such capabilities may include, for example, configuring the Node Manager module in a manner specific to the software component to enable the Node Manager module to generate the additional data, or instead providing a standard interface in Node Manager modules that different software components may access and use with data specific to those software components. By using one or more of these described techniques, benefits may be provided that include preventing a malicious entity from capturing an authentication response sent via a provided interface and successfully using it in other circumstances (e.g., on a different computing node, at a different time, with a different software component, etc.) to gain unauthorized access to use of a software component.

Software components that are used by or as software programs may be of various types in various embodiments, with a non-exclusive list of types of software components including software libraries, JavaBeans, ActiveX controls, scripts, objects, etc. Such software components may similarly provide a variety of types of capabilities and functions to software programs that use the software components. In addition, as noted above, a user who provides or is otherwise associated with a software component may in some embodiments interact with the configurable component usage system to configure pricing and other information for use of the software component by other software programs, such as to specify one or more alternative or complementary configured usage models that correspond to use of the software component by a software program. For example, a software component may define pricing conditions that are based on an indicated amount of use of one or more use dimensions (e.g., an indicated price for each use of the component; an indicated price per amount of time of use; an indicated price per unit of processing time; an indicated price per unit of storage used; an indicated price per unit of data transferred in; an indicated price per unit of data transferred out; an indicated price for a predetermined number of times of use in a predetermined period of time, etc.), such as to reflect an amount of computing resources used by the software component when executing. The user who performs the configuration for a software component may be a component developer user or other user that is involved in creation of the component, or another user otherwise associated with the component (e.g., a distributor or other provider of the component).

Software programs that use such software components may similarly be of a variety of types in various embodiments, including, for example, client-side application programs designed to execute on computing devices of end users, server-based applications that end users may access using remote client devices (e.g., Web applications accessed via a Web browser executing on a client device of an end user), etc. The software programs may further include applications with a graphical user interface (e.g., desktop applications or Web applications), a command-line interface (e.g., for a system utility), and/or a programmatic interface accessed via electronic messages or other electronic interactions by other remote executing software. In addition, in some embodiments, the software programs may each be an executable software image. Such executable software images may, for example, be virtual machine images (e.g., images that are bootable or otherwise loadable by a virtual machine and that each include operating system software and/or software for one or more application programs).

To perform the configuration for a component, in at least some embodiments, a component creator user (or other user) interactively configures a usage model for each selected component to correspond to use of the component via the component. A configured usage model for a component may include a variety of pricing terms and other information related to use of the component, such as a configured indicated price for a configured indicated amount of use of a configured indicated use dimension (e.g., an indicated price for each use of the component, an indicated price per amount of time of use, etc.). In addition, in some situations a software program that later uses a selected component may be a fee-based application that has a predefined usage model that specifies fees for use of the application, such as with pricing terms specified by a creator of the application. If so, pricing for using the component via the application may differ from the predefined usage model for the component in one or more ways, such as by having a differing use price, a differing amount of use, and/or a differing use dimension (e.g., to specify different configured prices for the same amount of use of the same use dimension, such as higher configured prices; to specify configured prices for one or more new custom use dimensions that are not used by the underlying component; to specify configured prices for a different amount of use of the same use dimension; etc.).

In addition, a configured usage model for a particular component may further include conditions that specify other types of criteria or other information in at least some embodiments, such as access criteria to control which other users are allowed to execute that component (e.g., to indicate that all other users are allowed, to indicate particular users that are allowed and/or excluded, to indicate groups of users that are allowed and/or excluded, to indicate characteristics of users that are allowed and/or excluded, etc.) and/or to indicate other conditions under which execution of that component is allowed or not allowed (e.g., conditions related to day and/or time, such as one or more times during which the use of the software component is allowed or is disallowed; conditions related to a type of use of the executing component, such as one or more types of software programs with which the use of the software component is allowed or is disallowed, and/or one or more types of computing-related resources with which the use of the software component is allowed or is disallowed; conditions related to geographical locations, such as one or more geographical locations at which the use of the software component is allowed or is disallowed; conditions related to types of applicable taxes or other regulatory legal schemes; etc.). Additional details related to examples of configuring usage models for use of a service or a component are included in U.S. patent application Ser. No. 12/980,214, filed Dec. 28, 2010 and entitled "Managing Use Of Software Components," and in U.S. patent application Ser. No. 11/618,486, filed Dec. 29, 2006 and entitled "Providing Configurable Use By Applications Of Sequences Of Invocable Services," each of which is hereby incorporated by reference in its entirety.

In addition, the program execution service may perform various operations to manage execution of a component-based software program, including to load at least a portion of the software program onto each of one or more computing nodes to be used for the execution. The loading of such software onto a computing node may be performed in various manners. For example, in some embodiments, a software image may be created that includes all of the desired software (optionally including one or more software components to be executed on the computing node), and that created software image may be distributed to the computing node (e.g., over a network, such as dynamically at a time of the request for execution or instead in advance of an execution request; via storage on a computer-readable storage medium, such as in advance of an execution request; etc.). The distributed software may further be stored on local non-volatile storage of the computing node, or in some embodiments, if applicable, maintained instead on the computer-readable storage medium on which the software was distributed. In other embodiments, a logical storage volume may be created on which the software is stored, and the storage volume may be mounted on the computing node (e.g., dynamically at a time of a request for execution or instead in advance of an execution request) to enable the software to be accessed from it. Additional details related to the use of such logical storage volumes are included in U.S. patent application Ser. No. 12/188,943, filed Aug. 8, 2008 and entitled "Providing Executing Programs With Reliable Access To Non-Local Block Data Storage," which is hereby incorporated by reference in its entirety.

In addition, in some embodiments the configurable component usage system and/or program execution service may charge various fees for the functionality that they provide. For example, the configurable component usage system may charge a fee to a component creator user for providing capabilities to allow the component creator user to specify one or more configured usage models for a software components, such as a one-time fee, a fee for each time that the software component is integrated into a software program and/or executed, etc. Similarly, the program execution service may charge a fee to a user for integrating a software component into a software program, for executing a software program, for providing capabilities to meter usage of software components during execution, etc. Additional details related to configuring prices and usage models are included in U.S. patent application Ser. No. 11/618,469, filed Dec. 29, 2006 and entitled "Providing Configurable Pricing For Use Of Invocable Services By Applications," which is hereby incorporated by reference in its entirety.

FIG. 3 is a block diagram illustrating example computing systems suitable for executing an embodiment of a system for providing a program execution service that manages authorization determinations for use of software components. In particular, FIG. 3 illustrates a group 399 of computing systems and inter-network(s), such as a data center or other group of co-located computing nodes. In some embodiments, some or all of the computing systems of the group 399 may be used by an embodiment of the PES system to use some or all of the described techniques as part of executing programs for users. The group 399 includes a server computing system 300, a host computer system 350 capable of executing one or more virtual machines, other host computer systems 390 that are similar to host computer system 350, and an optional Node Manager module 360 that manages host computer systems 390 and that executes on one of the computing systems 390 or on another computing system (not shown). The server computing system 300 and host computer systems 350 and 390 are connected to one another via an internal network 380 in this example, which includes a networking device 362 and other networking devices (not shown). The network 380 may, for example, be an interconnection network that joins multiple disparate physical networks (not shown) for the group 399 and provides access to external networks (not shown) and/or systems, such as other computing systems 395. In addition, in this example, one or more edge module devices 365 may be used to connect the internal network 380 at the location 399 to external computing systems at other locations.

The server computing system 300 in this example operates to provide at least some modules of a program execution service system, as well as optionally one or more other systems. The computing system 300 includes one or more hardware CPU ("central processing unit") processors 305, various hardware I/O ("input/output") components 310, storage 330, and memory 320. The illustrated I/O components include a display 311, network connection 312, computer-readable media drive 313, and other I/O devices 315 (e.g., a mouse, keyboard, speakers, etc.).

An embodiment of a program execution service system 340 is executing in memory 320, and it includes a system manager module 342 and optionally one or more other modules 344. The PES system 340 interacts with the other external computing systems 395 over the network 380 and one or more external networks (not shown) outside the group 399 (e.g., via the Internet and/or the World Wide Web, via a private cellular network, etc.) in various manners. The other external computing systems may similarly execute various software as part of the interactions, and may also each include hardware components similar to components 305-330 of server computing system 300, although such details are not illustrated in this example for the sake of brevity. For example, users of the program execution service may use client computing systems 395 to access functionality of the program execution service (e.g., in a manner similar to the computing systems 140 of FIG. 1), such as via Web browsers or other client-side software executing on those client computing systems—such users may, for example, specify information for software programs to be executed, including to indicate restricted software components that will be included in or otherwise used by such a software program. In addition, providers of software components may use client computing systems 395 to interact with the program execution service (e.g., in a manner similar to the computing systems 160 of FIG. 1), such as to provide restricted software components and their usage models, to provide software programs that include restricted software components, to provide instructions related to authorizations of particular users to user particular software components in particular manners, etc. Such providers may also interact with an embodiment of a configurable component usage system, such as may be one of the optional other systems 345 executing in memory 320, or instead may be executing on one or more other external computing systems 395. When the PES system receives information about software components, whether from the providers of the software components, distinct creators of software programs that include software components, and/or from users who supply software programs to be executed that include software components, information about the software components is stored in this example in the component database data structure 332 on storage 330, including to store information about the associated usage models for restricted software components. In addition, information about various users of the PES system 340 is stored in this example in the user database data structure 336 on storage 330, and information about use of software components by users (e.g., information from tracking or monitoring software execution for users) is stored in information 334 on storage 330. Various other information may similarly be stored but is not illustrated in this example (e.g., copies of software programs, information about software component providers distinct from other users, etc.), and it will be appreciated that what information is stored and how it is stored may vary in other embodiments.

The PES system 340 also interacts with various other host computer systems that it uses to execute software for users, such as host computer systems 350 and/or 390. The host computer system 350 operates to host one or more virtual machines, such as for use as computing nodes that execute programs on behalf of various users of the program execution service. The host computer system 350 includes one or more hardware CPU processors 352, various hardware I/O components 353, storage 351, and memory 355. While not illustrated here, the I/O components 353 may include similar components to those of I/O components 310. A Node Manager module 356 and one or more virtual machines 358 are executing in the memory 355, with the module 356 being part of hypervisor software that manages operations of the associated virtual machine computing nodes 358, as well as to assist in providing virtual interfaces and performing corresponding use authorization determinations for software components included in executing software on those virtual machine computing nodes. In particular, the Node Manager module 356 may facilitate various configurations of the virtual machines 358 so that each virtual machine has one or more virtual computer ports or other virtual interfaces 357 that are accessible to the Node Manager module 356 (e.g., virtual interface 357a for virtual machine 358a and virtual interface 357n for virtual machine 358n), as described in greater detail elsewhere. In addition, various information 354 may be stored on the storage 351 by the Node Manager module 356 and/or the remote system manager module 342, such as information about particular users and executing software for particular virtual machine computing nodes, about particular software components and associated usage models included in executing software, about current conditions that are used to determine when particular use conditions are satisfied (e.g., from tracking execution or other use of software components), etc. As described in greater detail elsewhere, the Node Manager module 356 may receive requests for use authorization determinations from the virtual machines 358 via the provided virtual interfaces 357, make corresponding authorization determinations (e.g., based at least in part on information 354), and provide corresponding authorization responses to the virtual machines via the provided interfaces. In at least some embodiments, the Node Manager module 356 includes various software instructions that when executed program one or more of the CPU processors 352 to provide the described functionality. The structure of the other host computer systems 390 may be similar to that of host computer system 350, or instead some or all other host computer systems may act directly as computing nodes by executing programs without using hosted virtual machines. In addition, the Node Manager module 360 may performs actions similar to those of Node Manager module 356, although in the illustrated embodiment the Node Manager module 360 is part of a proxy system for host computer systems 390. In a typical arrangement, the group 399 may include hundreds or thousands of host computer systems such as those illustrated here, organized into a large number of distinct physical sub-networks and/or networks.

The PES system 340 embodiment executing in memory 320 of the computing system 300 may perform various operations to facilitate execution of programs for users, as described in greater detail elsewhere. In some embodiments, the system 340 further performs automated operations to determine fees owed by particular users for the execution of particular software programs, such as based at least in part on the tracked usage of the included software components, on fee-based use conditions in the configured usage models for those software components, on separate fees charged for other creators or providers of the software programs, on separate fees charged by the program execution service, etc. The program execution service may further in some embodiments perform automated operations to obtain corresponding payment for the determined fees in at least some embodiments (e.g., based on dynamically obtained or previously obtained payment information for the user, such as part of user account information for the user that may be stored by the PES system in the user database 336), although in other embodiments the PES system may instead provide information about the determined fees to one or more other systems to obtain payment. Such other systems may include, for example, an automated payment system that is one of the other computing systems 395 or an optional other system 345 executing in memory 320. In addition, the PES system 340 and the modules 342 and 344 may each in some embodiments include various software instructions that when executed program or otherwise configure one or more of the CPU processors 305 to provide described functionality.

It will be appreciated that systems 300, 350, 390, and 395, edge devices 365, and networking device 362 are merely illustrative and are not intended to limit the scope of the present invention. For example, computing system 300 and/or computer system 350 may be connected to other devices that are not illustrated, including through one or more networks external to the group 399, such as the Internet, via the Web, or via private networks (e.g., mobile communication networks, etc.). More generally, a computing node, computer system or other computing system may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules, such as if the functionality of a system manager module and one or more node manager modules are instead combined into a single module. Similarly, in some embodiments the functionality of some of the illustrated modules may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
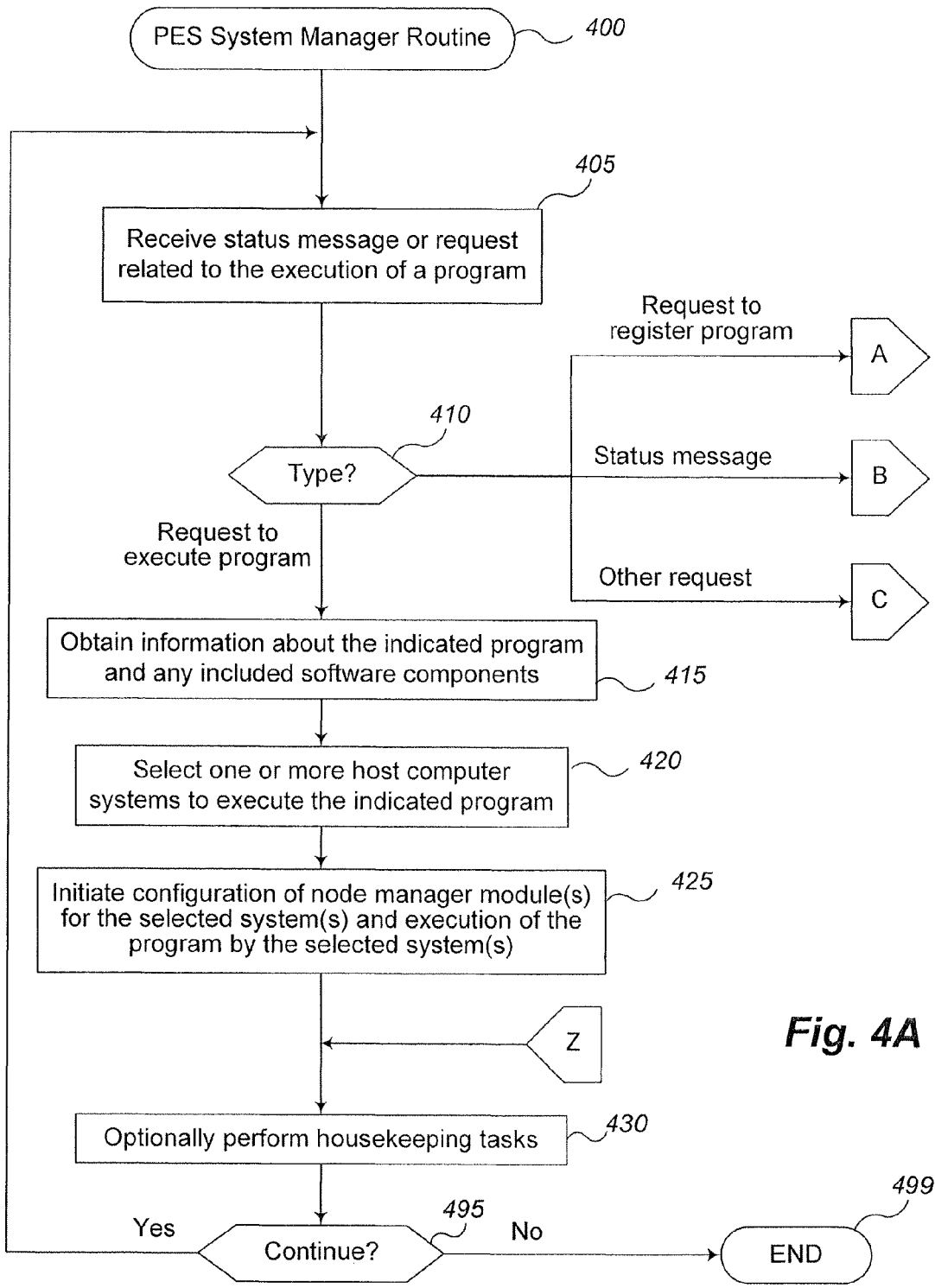
FIGS. 4A-4B are a flow diagram of an example embodiment of a System Manager routine for a program execution service.
Figure 4B:
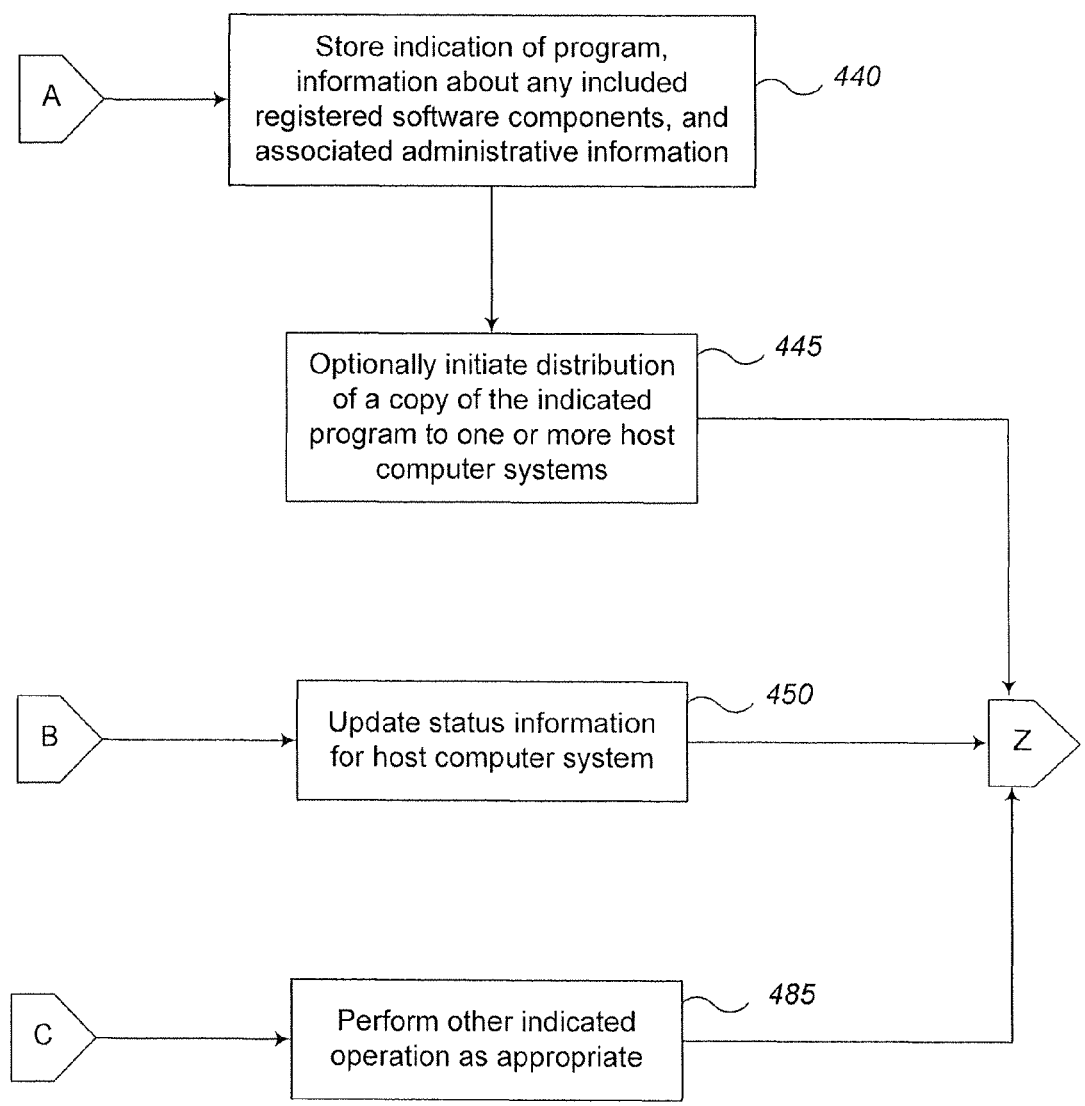

FIGS. 4A and 4B are a flow diagram of an example embodiment of a PES

System Manager routine 400. The routine may be provided by, for example, execution of a PES System Manager module 110 of FIG. 1, module 275 of FIG. 2, and/or module 342 of FIG. 3.

In the illustrated embodiment, the routine begins at block 405, where a status message or other request related to the execution of a program is received. The routine continues to block 410 to determine the type of the received message or request. If it is determined in block 410 that the type is a request to execute an indicated software program, such as from a user or other executing program, the routine continues to block 415 to obtain information about the indicated software program and any included software components, including any associated usage models for the software components. The information may be obtained in various manners, such as by being received in block 405, being retrieved from storage for a previously specified software program and/or software component, etc. After block 415, the routine continues to block 420 to select one or more host computer systems on which to execute the indicated program, such as from a group of candidate host computer systems available for program execution. In some embodiments, the one or more host computer systems may be selected in accordance with user instructions or other indicated criteria of interest, and/or to satisfy any use conditions associated with any included software components of the indicated software program.

The routine then continues to block 425 to initiate configuration associated with the program execution for each of the selected host computer systems, and to initiate execution of the program by each of the selected host computer systems, such as by interacting with a Node Manager module associated with each of the selected host computer systems. The configuration may include, for example, configuring a Node Manager module that is part of a hypervisor program on each selected host computer system that hosts virtual machine computing nodes (or other type of Node Manager module in other situations), such as to provide information about the user, indicated software program, and associated usage model with use conditions for each included software component. The configuration may further include taking actions for the computing node and/or the Node Manager module to provide one or more virtual interfaces for use by the included software component(s), as described in greater detail elsewhere. In block 430, the routine then optionally performs one or more housekeeping tasks (e.g., monitoring program execution by users, such as for metering and/or other billing purposes).

If it is instead determined in block 410 that the received request is to register a new program as being available for later execution, the routine continues instead to block 440 to store an indication of the program and associated administrative information for its use (e.g., access control information related to users who are authorized to use the program and/or authorized types of uses, information about included software components and their associated usage models, etc.), and may further store at least one centralized copy of the program in some situations. The routine then continues to block 445 to optionally initiate distribution of copies of the indicated program to one or more host computer systems for later use, such as to allow rapid startup of the program by those host computer systems by retrieving the stored copy from local storage of those host computer systems. In other embodiments, one or more copies of the indicated program may be stored in other manners, such as on one or more remote storage systems.

If it instead determined in block 410 that a status message is received in block 405 concerning one or more host computer systems, the routine continues instead to block 450 to update information concerning those host computer systems, such as to track usage of executing programs, usage of software components and/or other status information about host computer systems. In some embodiments, status messages are sent periodically by node manager modules, while in other embodiments, status messages may be sent at other times (e.g., whenever a relevant change occurs). In yet other embodiments, the routine 400 may instead request information from node manager modules and/or host computer systems as desired. Status messages may include a variety of types of information, such as the number and identity of programs currently executing on a particular computer system, the number and identity of software components included in currently executing software on a particular computer system, the number and identity of copies of programs currently stored in the local program repository on a particular computing system, performance-related and resource-related information (e.g., utilization of CPU, network, disk, memory, etc.) for a computer system, configuration information for a computer system, and reports of error or failure conditions related to hardware or software on a particular computer system.

If the routine instead determines in block 405 that another type of request or message is received, the routine continues instead to block 485 to perform one or more other indicated operations as appropriate. Such other operations may include, for example, suspending or terminating execution of currently executing programs, dynamically updating the authorization of a particular user to use a particular software component (e.g., to add or remove authorization in particular situations, such as based on instructions from a provider of the software component after the user purchases or otherwise obtains access to the software component, or based on other actions taken by the user to change authorization of the user to use the software component), dynamically modifying the use conditions or other parts of a usage model for a specified software component, and otherwise managing administrative aspects of the program execution service (registration of new users, determining and obtaining of payment for use of the program execution service, etc.). After blocks 445, 450 or 485, the routine continues to block 430 to optionally perform one or more housekeeping tasks. The routine then continues to block 495 to determine whether to continue, such as until an explicit termination instruction is received. If so, the routine returns to block 405, and if not continues to block 499 and ends.

While not illustrated here, in at least some embodiments, a variety of additional types of functionality to execute programs may be provided by a program execution service, such as optionally in conjunction with a configurable component usage system. In at least some embodiments, the execution of one or more copies or instances of a program on one or more computer systems may be initiated in response to a current execution request for immediate execution of those program instances. Alternatively, the initiation may be based on a previously received program execution request that scheduled or otherwise reserved the then-future execution of those program instances for the now-current time. Program execution requests may be received in various ways, such as directly from a user (e.g., via an interactive console or other GUI provided by the program execution service), or from an executing program of a user that automatically initiates the execution of one or more instances of other programs or of itself (e.g., via an API provided by the program execution service, such as an API that uses Web services). Program execution requests may include various information to be used in the initiation of the execution of one or more instances of a program, such as an indication of a program that was previously registered or otherwise supplied for future execution, and a number of instances of the program that are to be executed simultaneously (e.g., expressed as a single desired number of instances, as a minimum and maximum number of desired instances, etc.). In addition, in some embodiments, program execution requests may include various other types of information, such as the following: an indication of a user account or other indication of a previously registered user (e.g., for use in identifying a previously stored program and/or in determining whether the requested program instance execution is authorized); an indication of a payment source for use in providing payment to the program execution service for the program instance execution; an indication of a prior payment or other authorization for the program instance execution (e.g., a previously purchased subscription valid for an amount of time, for a number of program execution instances, for an amount of resource utilization, etc.); an indication of a prior payment or other authorization for the use of a particular software component included in the software program (e.g., a previously purchased subscription valid for an amount of time, for a number of software component uses, for an amount of resource utilization, etc.); and/or an executable or other copy of a program to be executed immediately and/or stored for later execution. In addition, in some embodiments, program execution requests may further include a variety of other types of preferences and/or requirements for execution of one or more program instances. Such preferences and/or requirements may include indications that some or all of the program instances be executed in an indicated geographical and/or logical location, such as in one of multiple data centers that house multiple computing systems available for use, on multiple computing systems that are proximate to each other, and/or on one or more computing system that are proximate to computing systems having other indicated characteristics.

Figure 5:
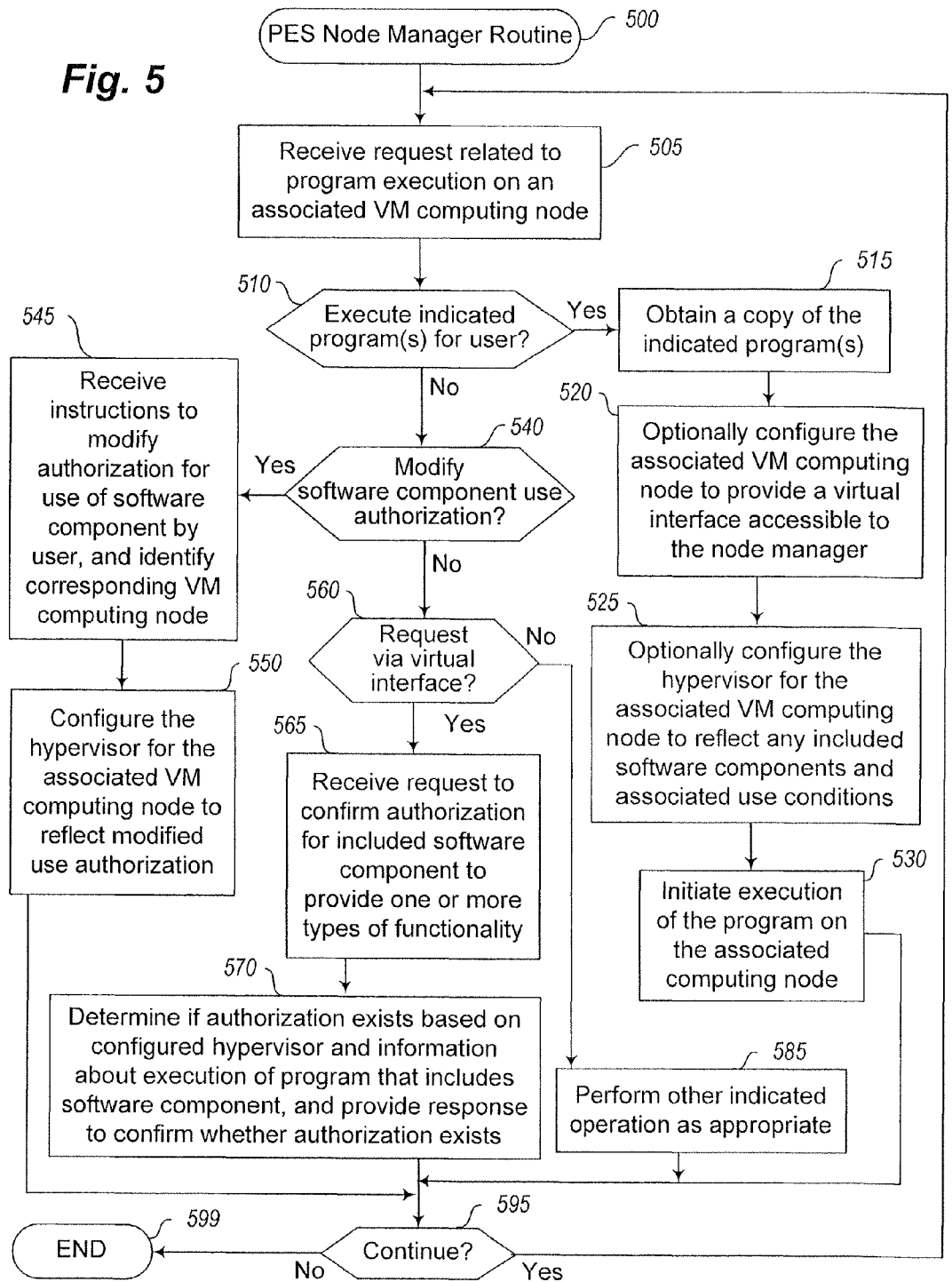
FIG. 5 is a flow diagram of an example embodiment of a Node Manager routine for a program execution service.

FIG. 5 is a flow diagram of an example embodiment of a Node Manager routine 500. The routine may be provided by, for example, execution of a Node Manager module 215 and/or 225 of FIG. 2, of a Node Manager module 356 and/or 360 of FIG. 3, and/or of a node manager module (not shown) of the program execution service system 105 of FIG. 1, such as to manage authorization determinations for software components in one or more associated computing nodes. In the illustrated embodiment, the program execution service provides functionality through a combination of one or more system manager modules and multiple node manager modules and optionally one or more other modules, although in other embodiments other configurations may be used (e.g., multiple node manager modules executing together in a coordinated manager without a separate system manager module, etc.). In addition, in the illustrated embodiment, the computing nodes used by the program execution service are virtual machine computing nodes hosted by physical computer systems, and the node manager routine executes as part of a hypervisor program on such a physical computer system, although in other embodiments other types of computing nodes may be used.

The illustrated embodiment of the routine begins in block 505, where a request is received related to program execution on an associated virtual machine computing node. The routine continues to block 510 to determine whether the request is related to executing one or more indicated programs on an indicated associated computing node, such as a request from a program execution service (e.g., with respect to block 425 of routine 400) and/or a user associated with those programs. If so, the routine continues to block 515 to obtain a copy of the indicated program(s), such as by receiving a program copy as part of the request in block 505, by retrieving a copy from local or non-local storage (e.g., from a remote storage service), etc. In block 520, the routine then optionally configures the associated virtual machine computing node to be used, such as to provide a virtual computer port or other virtual interface for use by any software components loaded on the computing node. In block 525, the routine then optionally performs configuration for the hypervisor program of which the routine 500 is a part, such as to store information about use conditions for any included software components, about determined authorization of the user to use particular features of the included software components (e.g., for features whose associated use conditions will not vary during the execution of the software), about the user and/or executing software and/or virtual machine computing node, etc. The routine then continues to block 530 to initiate execution of the program(s) on an associated computing node.

If it is instead determined in block 510 that the received request is not to execute one or more indicated programs, the routine continues instead to block 540 to determine whether a request is received to modify the authorization for a user to use some or all features of a particular software component. If so, the routine continues to block 545 to receive instructions related to modifying the use authorization for a particular user and software component, and to identify one or more corresponding associated virtual machine computing nodes that have executing software for the user that include the software component. Such instructions may come, for example, from the PES system manager module and/or the provider of the software component (e.g., with respect to block 485 or routine 400), and may include instructions to add or remove authorization that are based on actions of the user (e.g., to purchase or otherwise obtain access to additional functionality), to modify use conditions for the software component that affect the user authorization, etc. As a non-exclusive example, the provider of the software component or program execution service may remove authorization for a software component to be used due to a change in available versions of the software component resulting in an authorization change for the software component version that is currently loaded on the computing node (e.g., a newer version of the included software component becoming available, such as to restrict authorization to use the currently loaded software component—non-exclusive examples include a newer version whose availability preempts or otherwise stops use of the currently loaded version, a newer version that corrects problems in the currently loaded version or otherwise includes improvements relative to the currently loaded version, and a newer version with associated fees and/or other associated restrictions that are less than or otherwise different from the currently loaded version; a change in authorization to use the currently loaded version of the software component, such as it was only available for a limited time or under other specified conditions that are no longer satisfied; etc.), based on a corresponding usage license expiring or being revoked, etc. In block 550, the routine then configures the identified virtual machine computing nodes to reflect the modified use authorization.

If it is instead determined in block 540 that the received request of block 505 is not to modify the authorization for a user to use some or all features of a particular software component, the routine continues instead to block 560 to determine whether a request or other information is received from an included software component via a provided virtual interface. If so, the routine continues to block 565 to receive a request to confirm authorization for an included software component to provide one or more types of functionality. While not illustrated here, in other embodiments and situations other types of messages may be received from an included software component, whether via a provided virtual interface or instead in another manner—such other messages may, for example, include a status message from an included software component (e.g., to indicate that the included software component is currently in use or not currently in use, has received a request or other attempt to obtain access to one or more types of functionality, etc.), such as on a periodic basis or in response to an event of interest, or may include information based on interactions that the user has initiated with the software component to obtain access to features for which the user does not already have use authorization (e.g., all features, such as if the user does not initially have use authorization for any features of the software component; one or more particular features, such as for premium features; etc.). Alternatively, such other types of messages may instead by handled with respect to block 585 in the illustrated embodiment. In this illustrated embodiment, the routine then continues after block 565 to block 570 to determine if use authorization exists for the user and the included software component, and to provide a corresponding response via the provided virtual interface. Such a use authorization determination may be made in various manners in various embodiments, such as based on previous configuring of the hypervisor, previously stored configuration information for the virtual machine computing node, dynamically determined information about current conditions (e.g., based on monitoring activities), etc., as discussed in greater detail elsewhere. In addition, in some embodiments, encryption techniques may be used to enhance at least some communications sent via the provided virtual interface, such as to decrypt the received request and/or to encrypt the provided response in manners that are specific to one or more of the user, included software component and program execution service.

If it is instead determined in block 560 that the received request is not a request received via a provided virtual interface, the routine continues instead to block 585 to perform one or more other indicated operations as appropriate. The other operations may have various forms in various embodiments, such as information or requests from a virtual machine computing node that are other than use authorization determinations. In addition, in at least some embodiments, the routine 500 may further perform one or more other actions of a hypervisor.

After blocks 530, 550, 570, or 585, the routine continues to block 595 to determine whether to continue, such as until an explicit termination instruction is received. If so, the routine returns to block 505, and if not continues to block 599 and ends.

In addition, for at least some types of requests, the routine may in some embodiments further verify that the requester is authorized to make the request in one or more additional manners, such as based on access rights specified for the requester and/or an associated target of the request (e.g., an indicated user or software component). In some such embodiments, the verification of authorization may further include obtaining payment from the requester for the requested functionality (or verifying that any such payment has already been provided), such as to not perform the request if the payment is not provided. For example, types of request that may have associated payment in at least some embodiments and situations include requests to execute indicated programs, obtain access to some or all features of an indicated software component, perform some or all types of data access requests, and other types of indicated operations. Furthermore, some or all types of actions taken on behalf of users may be monitored and metered, such as for later use in determining corresponding usage-based fees for at least some of those actions.

Figure 6:
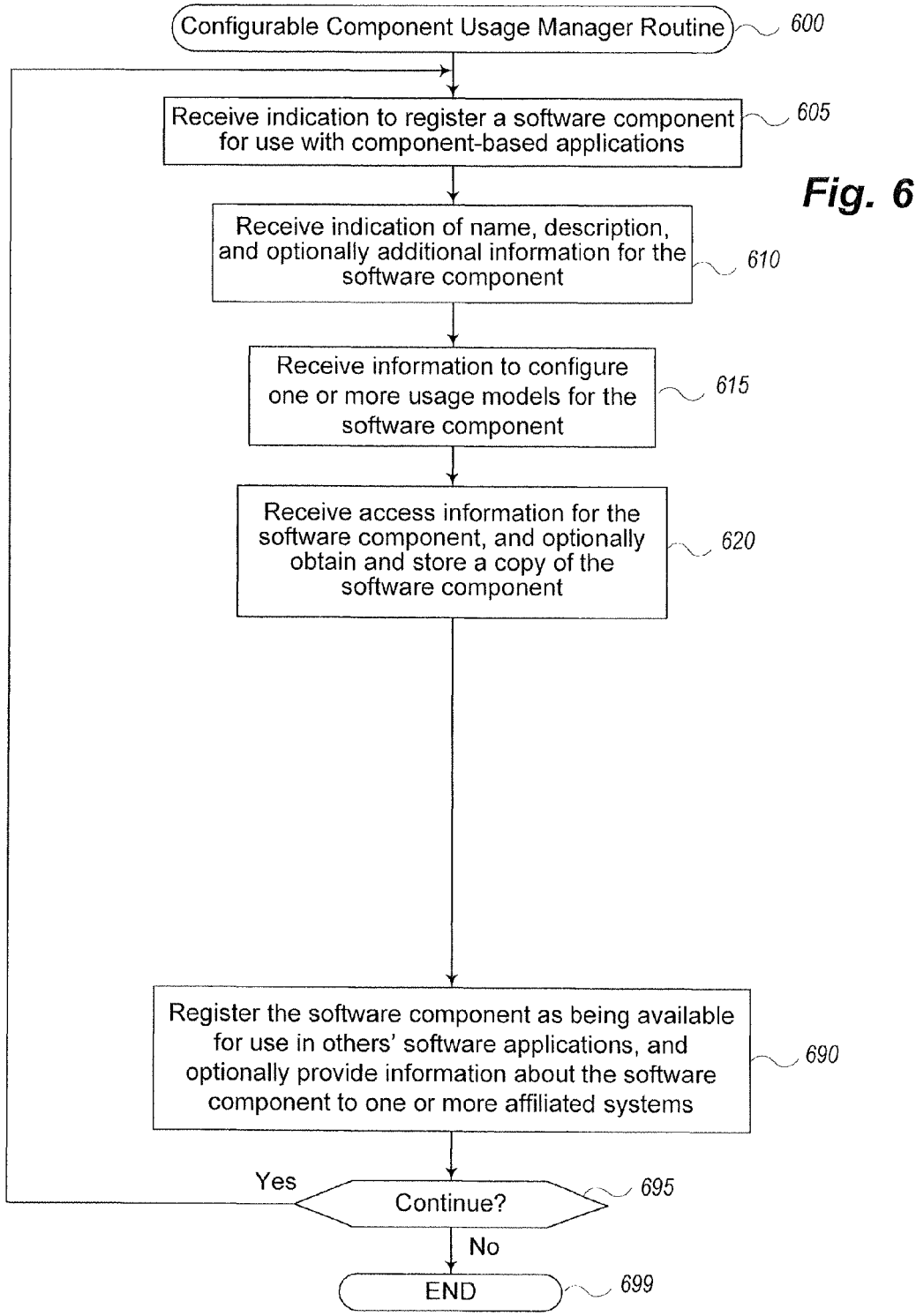
FIG. 6 is a flow diagram of an example embodiment of a Configurable Component Usage Manager routine.

FIG. 6 is a flow diagram of an example embodiment of a Configurable Component Usage Manager routine 600. The routine may, for example, be provided by execution of the configurable component usage system manager module 130 of FIG. 1, by the CCUS manager module 295 of FIG. 2, and/or by a configurable component usage system of FIG. 3 (e.g., one of the optional other systems 345), such as to allow component provider users to register their software components and to configure usage models for use of those software components. In this illustrated example, the software component registration is performed in an interactive manner by the component provider, although in other embodiments it may be performed in other manners.

The illustrated embodiment of the routine begins at block 605, where the routine receives an indication from a provider user to register a software component. In block 610, information is received from the user that indicates a name, a description and optionally additional information for the software component. A variety of types of additional information may be specified, as discussed in greater detail elsewhere. In block 615, the routine then receives information from the user to configure one or more usage models for the software component. As discussed in greater detail elsewhere, each such configured usage model may optionally have one or more fee-based pricing conditions and may optionally have one or more non-pricing conditions. In block 620, the routine then receives access information from the user for use in accessing the software component as needed, such as by receiving an uploaded copy of the software component or by receiving information to enable later retrieval of the software component (e.g., from an indicated network-accessible location).

After block 620, the routine continues to block 690 to complete the registration of the software component so that it is available for use by the program execution service when included in software programs, including to store the information received in blocks 610-620, and further optionally provides information about the registered software components to one or more affiliated systems. As described in greater detail elsewhere, such affiliated systems may include, for example, an embodiment of a program execution service system providing a program execution service. While not illustrated here, in some embodiments the routine may further receive and/or provide encryption-related information when interacting with the program execution service.

After block 690, the routine continues to block 695 to determine whether to continue, such as until an explicit indication to terminate is received. If so, the routine returns to block 605, and if not continues to block 699 and ends.

Figure 7:
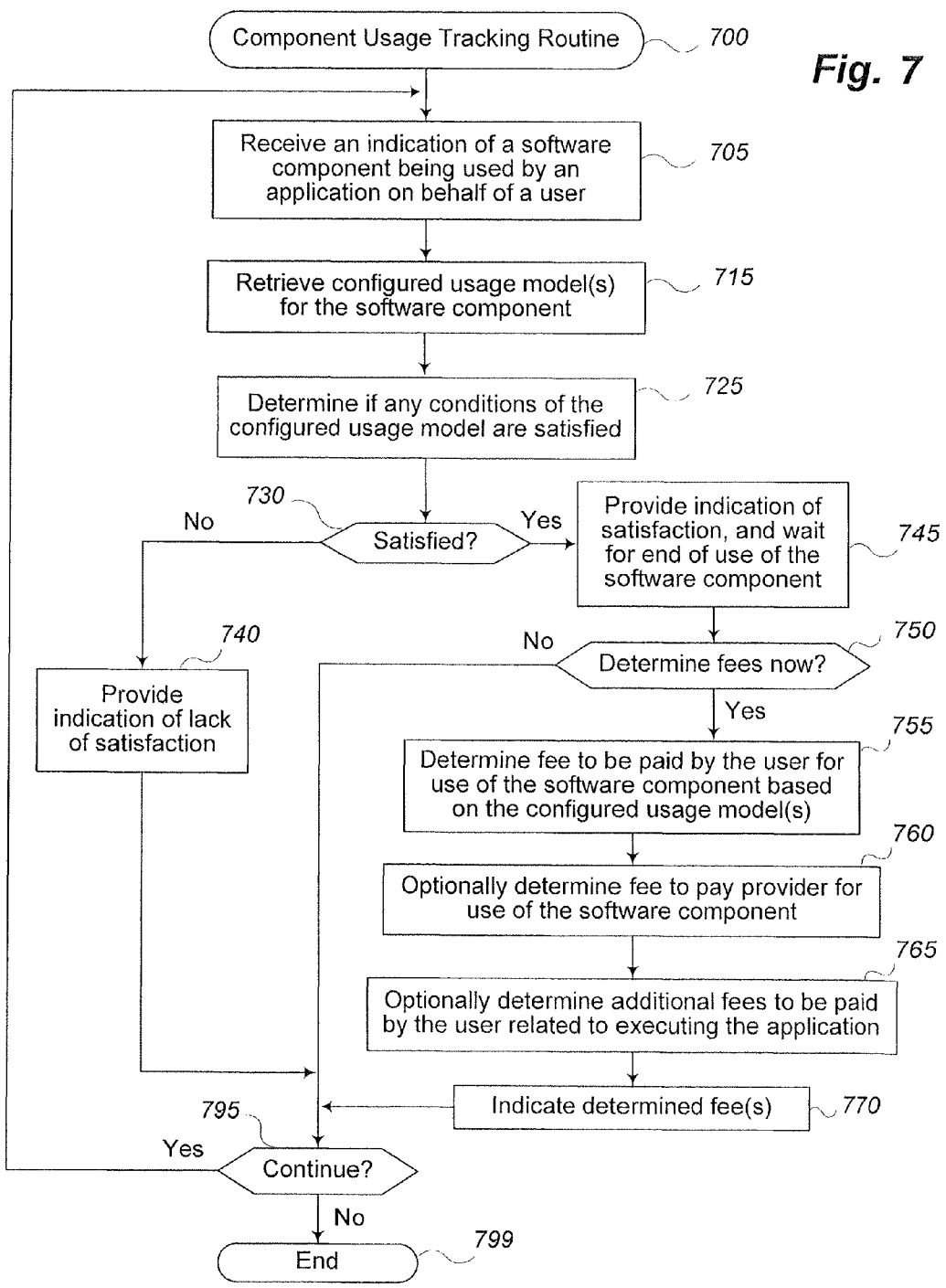
FIG. 7 is a flow diagram of an example embodiment of a Component Usage Tracking routine.

FIG. 7 is a flow diagram of an example embodiment of a Component Usage Tracking routine 700. In particular, in at least some embodiments, the managing of the execution of a software program by the program execution service includes tracking use of at least the software components and optionally of other aspects of the executing software programs, with the routine of FIG. 7 illustrating one example of a routine for performing such tracking. Such tracking may be performed by one or more modules of the program execution service, such as the node manager routine 500 of FIG. 5, the system manager routine 400 of FIGS. 4A-4B, and/or other PES module. In some embodiments, if one or more conditions of a configured usage model of a registered software component are determined to not be satisfied, whether pricing conditions and/or non-pricing conditions, the execution or other use of the software program may not be initiated and/or may be halted if execution has already begun, while in other embodiments other types of actions may be taken. In addition, in some embodiments, the routine may execute continuously or periodically, or instead as initiated by another routine.

The illustrated embodiment of the routine begins at block 705, where an indication is received of a software component being used or attempting to be used by a software program on behalf of a user. In the illustrated embodiment, the received indication may reflect an access request that is performed before the component use occurs, or may reflect an indication of actual component use that is made during or after the component use occurs. After receiving the indication, the routine continues to block 715 to retrieve information for use in determining corresponding fees for the component use and any restrictions on the component use, including any configured usage models for the software component that specify pricing conditions and/or non-pricing conditions.

In the illustrated embodiment, the routine next continues to block 725 to determine if the use of the software component is authorized based on any conditions from the retrieved configured usage models being satisfied. After block 725, the routine continues to block 730 to determine whether the component use is authorized, and if not continues to block 740 to provide an indication of a lack of authorization. If the component use is authorized, the routine continues instead to block 745 to provide an indication of authorization, and to wait until the use of the software component has ended. While the condition satisfaction is thus only verified once in the illustrated embodiment, in other embodiments the satisfaction of the conditions may continue to be tracked during some or all of the use of the software component.

After block 745, the routine continues to block 750 to determine whether fees should be determined now, such as if fees are determined for each component use indication, or if a specified amount of time or component use have occurred since a last time that fees were determined. If not, or after block 740, the routine continues to block 795. If fees are to be determined now, however, the routine continues instead to block 755 to determine one or more fees to be paid by the user. The fee(s) to be paid by the end user may be determined, for example, by retrieving the configured usage model for use of the software component, and applying the configured use price(s) to any currently received information regarding an amount of use of the indicated software component. If the fee determination is to be performed for more than just the current component usage, stored information about prior component use by one or more application copies of behalf of the user may be retrieved and similarly used to determine one or more corresponding fees. Once the fee(s) to be paid by the user are determined, the routine continues to block 760 to optionally determine one or more fees to be paid to the provider of the indicated software component, such as a percentage or other portion (or all) of the fees determined in block 755 based on use of the software component. The routine next continues to block 765 to optionally determine any additional fee(s) to be paid by the user for the execution of the software program that are not specific to the software component, such as based on use of particular computing nodes and/or other computing-related resources (e.g., storage, bandwidth, processor utilization, etc.), including fees (if any) charged by the program execution service related to the execution. The routine then continues to block 770 to indicate the determined fees, such as in response to a request received in block 705.

After blocks 740 or 770, or if it is instead determined to block 750 not to determine fees now, the routine continues to block 795 to determine whether to continue, such as until an explicit indication to terminate is received. If so, the routine returns to block 705, and if not continues to block 799 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium whose contents configure a computer system to perform a method, the method comprising:
   executing software on a first virtual machine hosted by the configured computer system, the executing software including a software component having an associated usage model that indicates one or more conditions for use of the software component, the configured computer system further executing a hypervisor program that manages operations of one or more virtual machines hosted on the configured computer system that include the first virtual machine;
   configuring the executing hypervisor program to enable use of the software component on the first virtual machine in accordance with the indicated conditions of the associated usage model; and
   under control of the executing hypervisor program, facilitating providing by the included software component of one or more types of functionality by:
      receiving a request from the included software component to confirm authorization for the included software component to provide the one or more types of functionality for the executing software on the first virtual machine, the request being received via a virtual interface accessible from the first virtual machine; and
      providing a response to the included software component via the virtual interface that indicates whether the authorization is confirmed, the providing of the response being based on the configuring of the executing hypervisor program and on the indicated conditions of the associated usage model.

2. The non-transitory computer-readable medium of claim 1 wherein the executing software on the first virtual machine is a software program that includes the software component, wherein the software program is executed on behalf of a user, wherein the software component is provided by a provider who is distinct from the user and who specifies the one or more conditions for use for the software component, and wherein the configuring of the executing hypervisor program is based at least in part on an indication of agreement by the user to the conditions for use specified by the provider.

3. The non-transitory computer-readable medium of claim 1 wherein the configured computer system is part of a program execution service and hosts multiple virtual machines that are each configurable to operate as a distinct computing node for the program execution service, wherein the executing of the software is initiated by the program execution service on behalf of a user who is a customer of the program execution service, and wherein the method further comprises configuring the first virtual machine to provide the virtual interface.

4. The non-transitory computer-readable medium of claim 3 wherein the one or more indicated conditions for use of the software component include one or more prices for an indicated amount of use of the software component, and wherein the method further comprises:
   tracking satisfaction of the indicated conditions for use, the tracking of the satisfaction including tracking an actual amount of use of the software component during execution of the software on the first virtual machine;
   automatically determining a fee owed by the user for the execution of the software based at least in part on the included one or more prices and on the tracked actual amount of use of the software component and on one or more fees charged by the program execution service for the use of the first virtual machine; and
   providing an indication of the determined owed fee to enable payment to be obtained from the user for the determined owed fee to satisfy the indicated conditions for use of the software component.

5. The non-transitory computer-readable medium of claim 1 wherein the software component is a software application program, wherein the executing software on the first virtual machine is the software application program, wherein the computer-readable medium is a memory of the configured computer system, and wherein the contents are instructions that when executed program the configured computer system to perform the method.

6. A computer-implemented method comprising:
   executing, by a configured computer system, software on a first virtual machine hosted by the configured computer system, the executing software including a software component having an associated usage model that indicates one or more conditions for use of the software component, the configured computer system further executing a hypervisor program that manages operations of one or more virtual machines hosted on the configured computer system that include the first virtual machine;
   configuring the executing hypervisor program to enable use of the software component on the first virtual machine in accordance with the indicated conditions of the associated usage model; and
   under control of the executing hypervisor program on the configured computer system, enabling providing by the included software component of one or more types of functionality by:
      receiving a request from the included software component to confirm authorization for the included software component to provide the one or more types of functionality for the executing software on the first virtual machine, the request being received via a virtual interface accessible from the first virtual machine; and
      providing a response to the included software component via the virtual interface that indicates whether the authorization is confirmed, the providing of the response being based on the configuring of the executing hypervisor program and on the indicated conditions of the associated usage model.

7. The computer-implemented method of claim 6 wherein the executing software on the first virtual machine is a software program that includes the software component and includes other software.

8. The computer-implemented method of claim 7 wherein the software program is executed on behalf of a user, wherein the software component is provided by a provider who is distinct from the user and who specifies the one or more conditions for use for the software component, and wherein the configuring of the executing hypervisor program is based at least in part on an indication of agreement by the user to the conditions for use specified by the provider.

9. The computer-implemented method of claim 6 wherein the configured computer system is part of a program execution service and hosts multiple virtual machines that are each configurable to operate as a distinct computing node for the program execution service, and wherein the executing of the software is initiated by the program execution service on behalf of a user who is a customer of the program execution service.

10. The computer-implemented method of claim 9 further comprising, before the executing of the software of the first virtual machine, receiving a request from the user that specifies the software, and provisioning the first virtual machine in response to the request to enable the executing of the software by the first virtual machine.

11. The computer-implemented method of claim 9 wherein the one or more indicated conditions for use of the software component include one or more prices for an indicated amount of use of the software component, and wherein the method further comprises:
 tracking satisfaction of the indicated conditions for use, the tracking of the satisfaction including tracking an actual amount of use of the software component during execution of the software on the first virtual machine;
 automatically determining a fee owed by the user for the execution of the software based at least in part on the included one or more prices and on the tracked actual amount of use of the software component and on one or more fees charged by the program execution service for the use of the first virtual machine; and
 providing an indication of the determined owed fee to enable payment to be obtained from the user for the determined owed fee to satisfy the indicated conditions for use of the software component.

12. The computer-implemented method of claim 6 wherein the software component is a software application program, and wherein the executing software on the first virtual machine is the software application program.

13. A computer system comprising:
 one or more processors; and
 one or more memories storing instructions that, when executed, configure the computer system to:
  execute software on a first virtual machine hosted by the configured computer system, the executing software including a software component having an associated usage model that indicates one or more conditions for use of the software component, the configured computer system further executing a hypervisor program that manages operations of one or more virtual machines hosted on the configured computer system that include the first virtual machine;
  configure the executing hypervisor program to enable use of the software component on the first virtual machine in accordance with the indicated conditions of the associated usage model; and
  under control of the executing hypervisor program, facilitate providing, by the included software component, of one or more types of functionality by:
   receiving a request from the included software component to confirm authorization for the included software component to provide the one or more types of functionality for the executing software on the first virtual machine, the request being received via a virtual interface accessible from the first virtual machine; and
   providing a response to the included software component via the virtual interface that indicates whether the authorization is confirmed, the providing of the response being based on the configuring of the executing hypervisor program and on the indicated conditions of the associated usage model.

14. The computer system of claim 13 wherein the executing software on the first virtual machine is a software program that includes the software component and includes other software.

15. The computer system of claim 14 wherein the software program is executed on behalf of a user, wherein the software component is provided by a provider who is distinct from the user and who specifies the one or more conditions for use for the software component, and wherein the configuring of the executing hypervisor program is based at least in part on an indication of agreement by the user to the conditions for use specified by the provider.

16. The computer system of claim 13 wherein the configured computer system is part of a program execution service and hosts multiple virtual machines that are each configurable to operate as a distinct computing node for the program execution service, and wherein the executing of the software is initiated by the program execution service in response to a request from a user who is a customer of the program execution service.

17. The computer system of claim 16 wherein the stored instructions further configure the computer system to, before the executing of the software of the first virtual machine, provision the first virtual machine in response to the request to enable the executing of the software by the first virtual machine.

18. The computer system of claim 16 wherein the one or more indicated conditions for use of the software component include one or more prices for an indicated amount of use of the software component, and wherein the stored instructions further configure the computer system to:
 track satisfaction of the indicated conditions for use, the tracking of the satisfaction including tracking an actual amount of use of the software component during execution of the software on the first virtual machine;
 determine a fee owed by the user for the execution of the software based at least in part on the included one or more prices and on the tracked actual amount of use of the software component and on one or more fees charged by the program execution service for the use of the first virtual machine; and
 provide an indication of the determined owed fee to enable payment to be obtained from the user for the determined owed fee to satisfy the indicated conditions for use of the software component.

19. The computer system of claim 13 wherein the software component is a software application program, and wherein the executing software on the first virtual machine is the software application program.

* * * * *